US012682505B2

(12) United States Patent
Yako et al.

(10) Patent No.: US 12,682,505 B2
(45) Date of Patent: Jul. 14, 2026

(54) SIGNAL PROCESSING METHOD, SIGNAL PROCESSING DEVICE, AND IMAGING SYSTEM

(71) Applicant: Panasonic Intellectual Property Management Co., Ltd., Osaka (JP)

(72) Inventors: Motoki Yako, Osaka (JP); Atsushi Ishikawa, Osaka (JP); Kazuya Hisada, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 825 days.

(21) Appl. No.: 17/930,093

(22) Filed: Sep. 7, 2022

(65) Prior Publication Data

US 2022/0414948 A1     Dec. 29, 2022

Related U.S. Application Data

(63) Continuation of application No. PCT/JP2021/008433, filed on Mar. 4, 2021.

(30) Foreign Application Priority Data

Mar. 26, 2020   (JP) ................................. 2020-056353
Feb. 17, 2021   (JP) ................................. 2021-023067

(51) Int. Cl.
  *G06T 11/00*     (2026.01)
  *G01J 3/28*      (2006.01)
  (Continued)

(52) U.S. Cl.
  CPC ............. *G06T 11/00* (2013.01); *G01J 3/2823* (2013.01); *G06T 7/90* (2017.01); *H04N 23/84* (2023.01);
  (Continued)

(58) Field of Classification Search
  CPC ................... G06V 20/194; G06V 10/58; G01J 2003/2826; G01J 3/2823; G06T 11/00
  See application file for complete search history.

(56) References Cited

U.S. PATENT DOCUMENTS

| | | | | |
|---|---|---|---|---|
| 9,599,511 B2 * | 3/2017 | Ando | ..................... | G01J 3/2823 |
| 2010/0185067 A1 * | 7/2010 | Gupta | ................... | G01J 3/1256 |
| | | | | 600/323 |

(Continued)

FOREIGN PATENT DOCUMENTS

EP      2776798 B1 * 12/2023   ............ G01J 3/2823

OTHER PUBLICATIONS

Mobaraki et al. (2018) Hyper-Tools. A graphical user-friendly interface for hyperspectral image analysis. Chemometrics and Intelligent Laboratory Systems. vol. 172, pp. 174-187 (Year: 2018).*

(Continued)

*Primary Examiner* — Chan S Park
*Assistant Examiner* — Chandhana Pedapati
(74) *Attorney, Agent, or Firm* — Wenderoth, Lind & Ponack, L.L.P.

(57) ABSTRACT

A signal processing method according to one aspect of the present disclosure includes obtaining compressed image data including two-dimensional image information that is obtained by compressing hyperspectral information corresponding to wavelength bands included in a target wavelength range, obtaining setting data including information designating one or more sub-wavelength ranges that are parts of the target wavelength range, and generating, based on the compressed image data, two-dimensional images corresponding to wavelength bands included in the one or more sub-wavelength ranges.

17 Claims, 24 Drawing Sheets

(51) Int. Cl.
    *G06T 7/90*       (2017.01)
    *H04N 23/84*     (2023.01)
(52) U.S. Cl.
    CPC ... *G01J 2003/2826* (2013.01); *G06T 2200/24*
        (2013.01); *G06T 2207/10024* (2013.01); *G06T*
                    *2207/20212* (2013.01)

(56) References Cited

U.S. PATENT DOCUMENTS

2016/0138975 A1*   5/2016   Ando ........................ G01J 3/28
                                    356/416
2020/0204745 A1*   6/2020   Tack ...................... G02B 5/283

OTHER PUBLICATIONS

RP Photonics, Hyperspectral Imaging. Jun. 30, 2019. Retrieved from Internet: <https://www.rp-photonics.com/hyperspectral_imaging.html>. Date accessed: Nov. 25, 2025. (Year: 2019).*
International Search Report of PCT application No. PCT/JP2021/008433 dated Jun. 1, 2021.

* cited by examiner

WAVELENGTH

WAVELENGTH

FIG. 9

| LOWER LIMIT WAVELENGTH OF UNIT BAND | UPPER LIMIT WAVELENGTH OF UNIT BAND | MASK IMAGE | BACKGROUND IMAGE | EXPOSURE TIME | GAIN |
|---|---|---|---|---|---|
| ········ | ········ | ········ | ········ | ········ | ········ |
| 400 | 401 | | | 10 | 2 |
| 401 | 402 | | | 15 | 1.8 |
| 402 | 403 | | | 12 | 1.2 |
| 403 | 404 | | | 13 | 1.6 |
| 404 | 405 | | | | |
| ········ | ········ | ········ | ········ | ········ | ········ |

FIG. 10

| IMAGE RESOLUTION | VGA |
| | 640 |
| | 480 |
| GAIN (dB) | 3 |
| EXPOSURE TIME (msec) | 50 |
| FRAME RATE (fps) | | save    load

COMPRESSED IMAGE

SPECTRAL IMAGE

FIG. 12

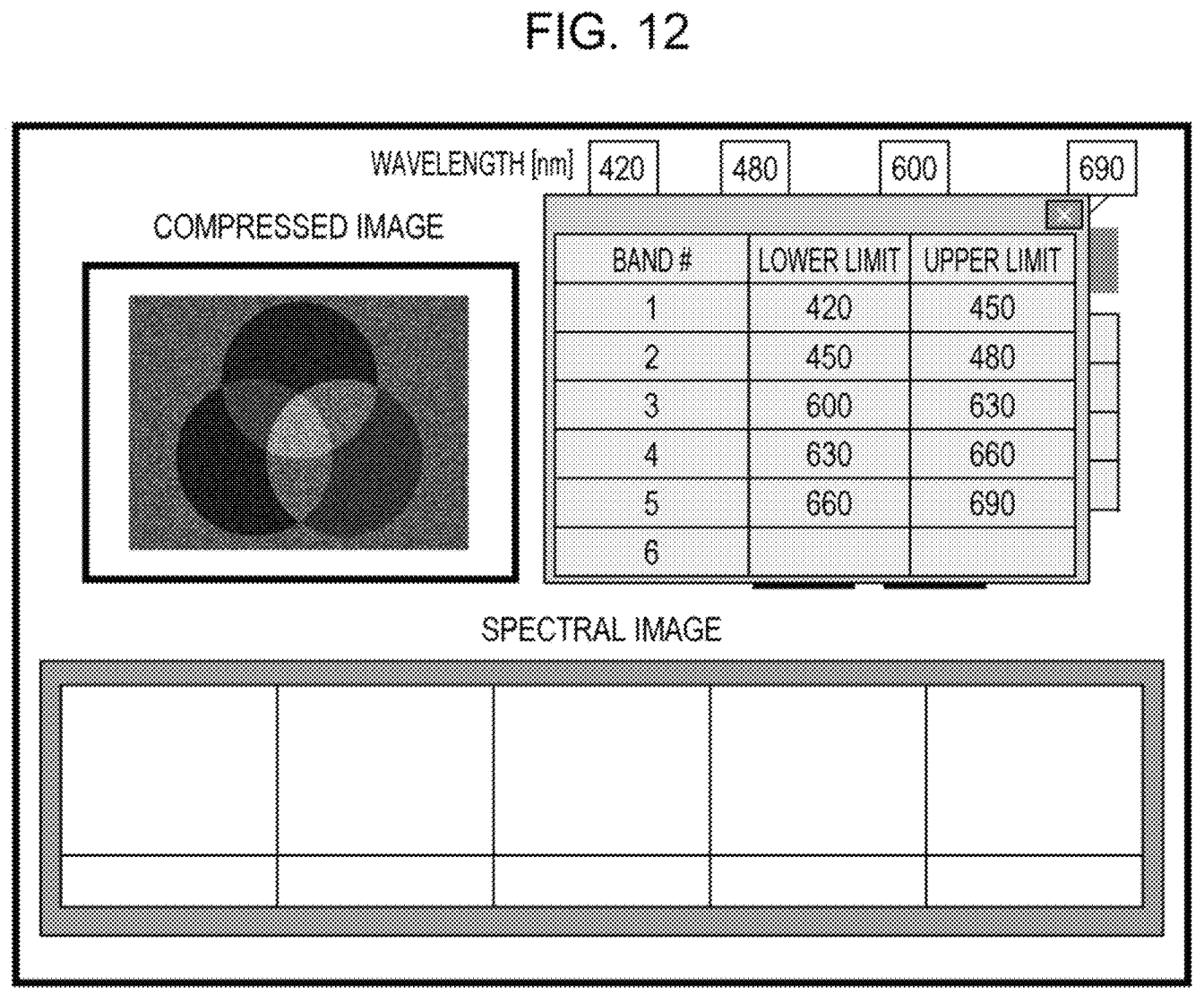

WAVELENGTH [nm]   420   480   600   690

| BAND # | LOWER LIMIT | UPPER LIMIT |
|--------|-------------|-------------|
| 1      | 420         | 450         |
| 2      | 450         | 480         |
| 3      | 600         | 630         |
| 4      | 630         | 660         |
| 5      | 660         | 690         |
| 6      |             |             |

COMPRESSED IMAGE

SPECTRAL IMAGE

FIG. 15A

| LOWER LIMIT WAVELENGTH OF POST-EDIT BAND | UPPER LIMIT WAVELENGTH OF POST-EDIT BAND | MASK IMAGE | BACKGROUND IMAGE | GAIN |
|---|---|---|---|---|
| ⋮ | ⋮ | ⋮ | ⋮ | ⋮ |
| 400 | 410 | | | 1.3 |
| 410 | 420 | | | 1.2 |
| 420 | 430 | | | 1.5 |
| 430 | 500 | | | 1.2 |
| 500 | 600 | | | |

FIG. 15B

| LOWER LIMIT WAVELENGTH OF POST-EDIT BAND | UPPER LIMIT WAVELENGTH OF POST-EDIT BAND | MASK DATA (MASK IMAGE / BACKGROUND IMAGE) | GAIN |
|---|---|---|---|
| ⋮ | ⋮ | ⋮ | ⋮ |
| 400 | 410 | | 1.4 |
| 410 | 420 | | 1.1 |
| 420 | 430 | | 1.2 |
| 430 | 500 | | 1.5 |
| 500 | 600 | | |

FIG. 17

SIGNAL PROCESSING METHOD, SIGNAL PROCESSING DEVICE, AND IMAGING SYSTEM

BACKGROUND

1. Technical Field

The present disclosure relates to a signal processing method, a signal processing device, and an imaging system.

2. Description of the Related Art

Detailed physical properties of an object, which have been impossible to detect with a usual RGB image, can be detected by utilizing spectral information in many bands, for example, several ten bands, each being a narrow band. A camera for obtaining such multiwavelength information is called a "hyperspectral camera". The hyperspectral camera is used in various fields such as food inspection, biological inspection, pharmaceutical development, and component analysis of minerals.

U.S. Pat. No. 9,599,511 discloses an example of a hyperspectral imaging device utilizing compressed sensing. The disclosed imaging device includes a coding element formed as an array of optical filters that are different in wavelength dependency of optical transmittance, an image sensor detecting light after passing through the coding element, and a signal processing circuit. The coding element is arranged on an optical path interconnecting a subject and the image sensor. The image sensor detects the light including superimposed components in individual wavelength bands for each of pixels at the same time, thereby obtaining one multiwavelength image. The signal processing circuit applies the compressed sensing to the obtained multiwavelength image by utilizing information of a spatial distribution of spectral transmittance of the coding element, thereby reconstructing image data for each of the wavelength bands.

SUMMARY

In the related-art hyperspectral imaging device, the image data is generated and displayed for each of all the wavelength bands included within a wavelength range of the obtained multiwavelength image (hereinafter referred to as a "target wavelength range"). Depending on the application, however, only information in part of the target wavelength range is needed. In such a case, generating information in an unnecessary wavelength band with high wavelength resolution cannot be said as being efficient.

One non-limiting and exemplary embodiment provides a technique for efficiently generating an image in a necessary wavelength band.

In one general aspect, the techniques disclosed here feature a signal processing method executed by a computer. The method includes obtaining compressed image data including two-dimensional image information that is obtained by compressing hyperspectral information in a target wavelength range, obtaining setting data to designate one or more sub-wavelength ranges that are parts of the target wavelength range, and generating, based on the compressed image data, two-dimensional images corresponding to wavelength bands included in the one or more sub-wavelength ranges.

According to the present disclosure, the image in the necessary wavelength band can be generated efficiently.

It should be noted that generic or specific embodiments of the present disclosure may be implemented in the form of a system, a device, a method, an integrated circuit, a computer program, or a recording medium such as a computer-readable recording disc, and in any selective combinations of a system, a device, a method, an integrated circuit, a computer program, and a recording medium. The computer-readable recording medium may include, for example, a nonvolatile recording medium such as a CD-ROM (Compact Disc-Read Only Memory). The device may be composed of one or more devices. When the device may be composed of two or more devices, those two or more devices may be arranged in one unit or may be separately arranged in different two or more units. In this Specification and Claims, the word "device" may indicate not only a single device, but also a system composed of devices.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 9 illustrates an example of mask data before conversion, the mask data being stored in a memory;

FIG. 10 illustrates an example of a GUI on which imaging conditions are to be input;

FIG. 12 illustrates an example of a GUI on which reconstruction conditions are to be input;

FIG. 15A illustrates an example of mask data after the conversion, which is to be recorded on the memory;

FIG. 15B illustrates another example of the mask data after the conversion, which is to be recorded on the memory;

FIG. 17 illustrates a configuration of a system in which a signal processing circuit does not execute the conversion of the mask information.

DETAILED DESCRIPTIONS

Figure 1A:
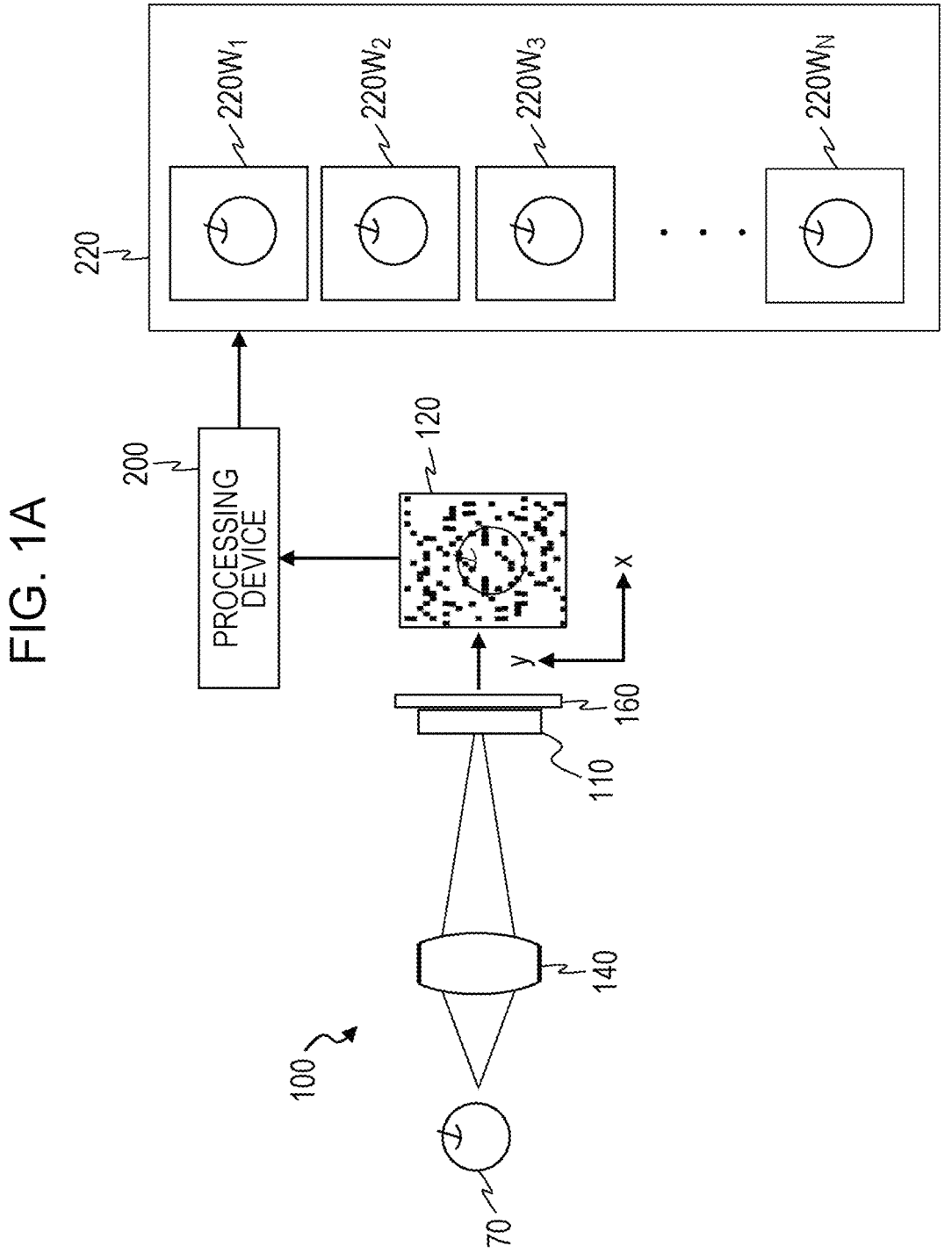
FIG. 1A is a schematic view of an exemplary hyperspectral imaging system.

It is to be noted that any embodiments described below represent generic or specific examples. Numerical values, shapes, materials, constituent elements, their layouts and positions, connection forms between the constituent elements, steps, order of the steps, etc., which are described in the following embodiments, are merely illustrative, and they are not purported to limit the scope of Claims. Ones of the constituent elements in the following embodiments, those ones being not stated in independent claims representing the most significant concept, are explained as optional constituent elements. Furthermore, the drawings are schematic views and are not always exactly drawn in a strict sense. In the drawings, substantially the same or similar constituent elements are denoted by the same reference sings. Duplicate description is omitted or simplified in some cases.

In the present disclosure, all or part of circuits, units, devices, members, or portions, or all or part of functional blocks in a block diagram may be implemented with, for example, one or more electronic circuits including a semiconductor device, a semiconductor integrated circuit (IC), or an LSI (large scale integration). The LSI or the IC may be integrated on one chip or may be formed in combination of chips. For instance, functional blocks except for storage elements may be integrated on one chip. While the term "LSI" or "IC" is used here, the electronic circuit may include a device called by a different name changing depending on a degree of integration, such as a system LSI, a VLSI (very large scale integration), or VLSI (ultra large scale integration). A Field Programmable Gate Array (FPGA) programmed after manufacturing of an LSI, or a reconfigurable logic device capable of reconstructing connection relations inside an LSI or setting up circuit zones inside an LSI can also be used for the same purpose.

Functions or operations of all or part of circuits, units, devices, members, or portions can be executed with software processing. In this case, software is recorded on one or more non-transitory recording media, such as a ROM, an optical disk, and a hard disk drive, and when the software is executed by a processor, the functions specified by the software are executed by the processor and a peripheral device. The system or the device may include one or more non-transitory recording media on which the software is recorded, the processor, and other required hardware devices such as an interface.

First, a configuration example of a hyperspectral imaging system according to an embodiment of the present disclosure and the knowledge found by the inventors are described.

FIG. 1A is a schematic view of an exemplary hyperspectral imaging system. The system includes an imaging device 100 and a processing device 200. The imaging device 100 has a similar configuration to that of the imaging device disclosed in U.S. Pat. No. 9,599,511. The imaging device 100 includes an optical system 140, a filter array 110, and an image sensor 160. The filter array 110 has a similar structure and function to those of the "coding element" disclosed in U.S. Pat. No. 9,599,511. In the following description, therefore, the filter array 110 is referred to as the "coding element" in some cases. The optical system 140 and the filter array 110 are arranged on an optical path of light incoming from an object 70 that is a subject to be imaged. The filter array 110 is arranged between the optical system 140 and the image sensor 160.

In FIG. 1A, an apple is illustrated as an example of the object 70. The object 70 is not limited to an apple and may be any desired object. The processing device 200 generates, based on image data generated by the image sensor 160, image data for each of wavelength bands included in a target wavelength range. That image data is referred to as "spectral image data" in this Specification. Here, the number of wavelength bands included in the target wavelength range is assumed to be N (N is an integer greater than or equal to four). In the following description, the generated spectral image data of the wavelength bands are referred to as spectral images $220W_1$, $220W_2$, . . . , $220W_N$, and these spectral images are collectively called a spectral image 220. In this Specification, data or signals representing an image, namely a set of data or signals indicating pixel values of individual pixels, may be referred to simply as an "image" in some cases.

The filter array 110 is an array of light-transmissive filters that are arrayed in rows and columns. The filters include plural types of filters different in spectral transmittance, namely in wavelength dependency of optical transmittance. The filter array 110 outputs the intensity of incident light after modulating the intensity per wavelength. This process executed by the filter array 110 is referred to as "coding" in this Specification.

In the example illustrated in FIG. 1A, the filter array 110 is arranged near or right on the image sensor 160. Here, the word "near" indicates that the filter array 110 is close to the image sensor 160 enough for an image of light from the optical system 140 to be formed on a surface of the filter array 110 in a relatively clear state. The wording "right on" indicates that the filter array 110 and the image sensor 160 are close to each other with a gap hardly left therebetween. The filter array 110 and the image sensor 160 may be in the integrated form.

The optical system 140 includes at least one lens. While FIG. 1A illustrates the optical system 140 as one lens, the optical system 140 may be a combination of lenses. The optical system 140 forms an image on an imaging surface of the image sensor 160 through the filter array 110.

Figure 1B:
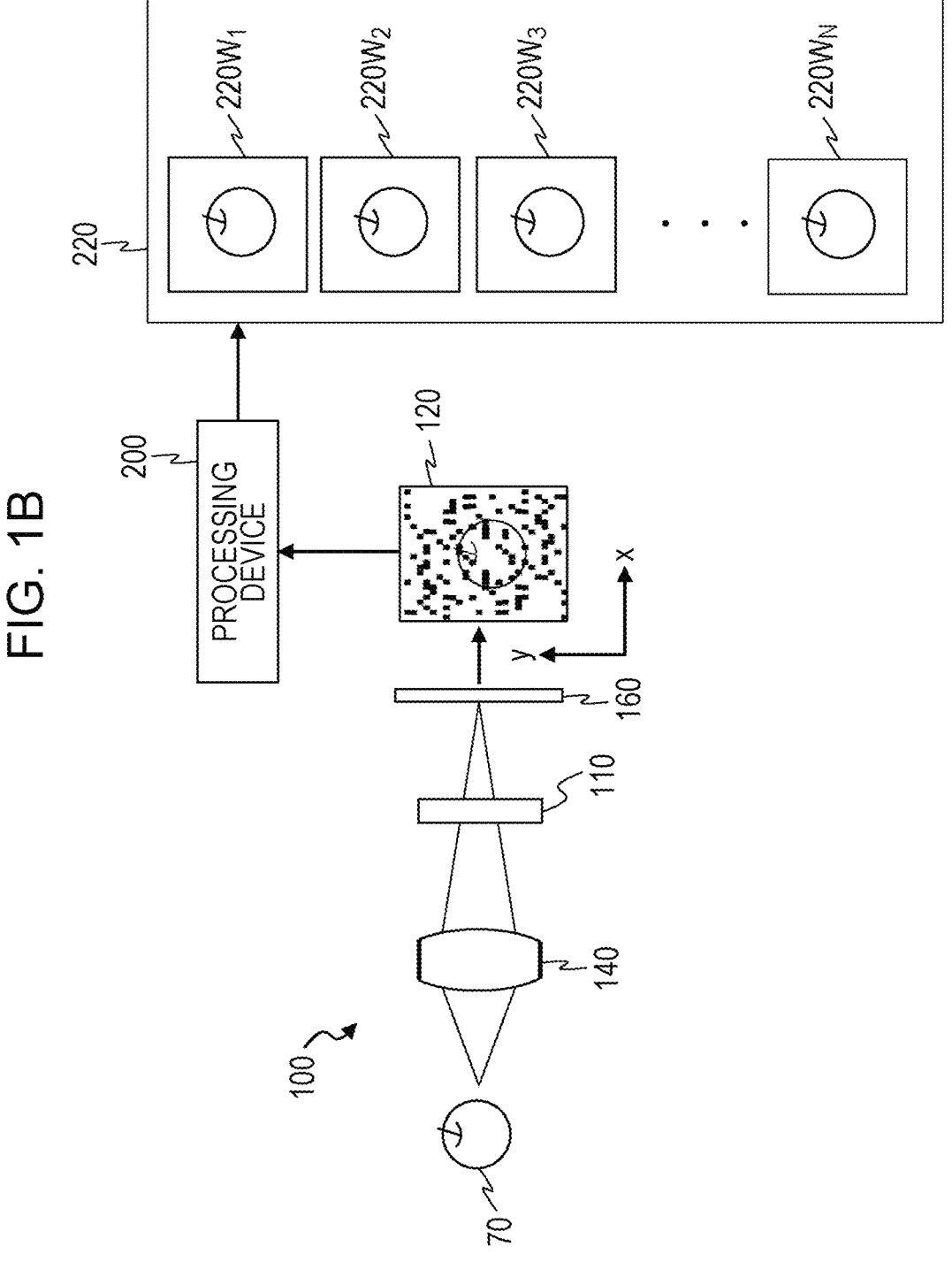
FIG. 1B is a schematic view of a first modification of the exemplary hyperspectral imaging system.
Figure 1C:
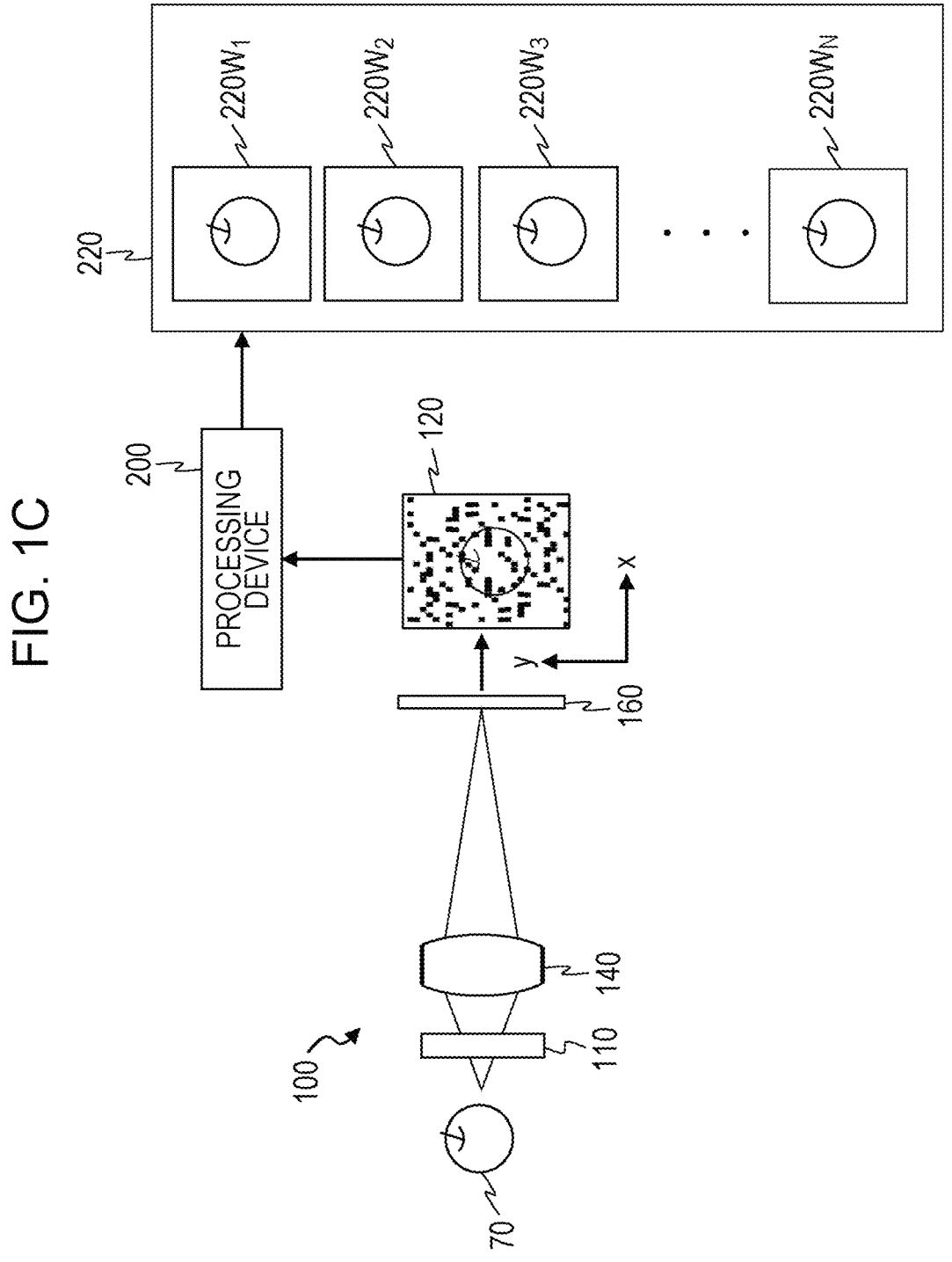
FIG. 1C is a schematic view of a second modification of the exemplary hyperspectral imaging system.
Figure 1D:
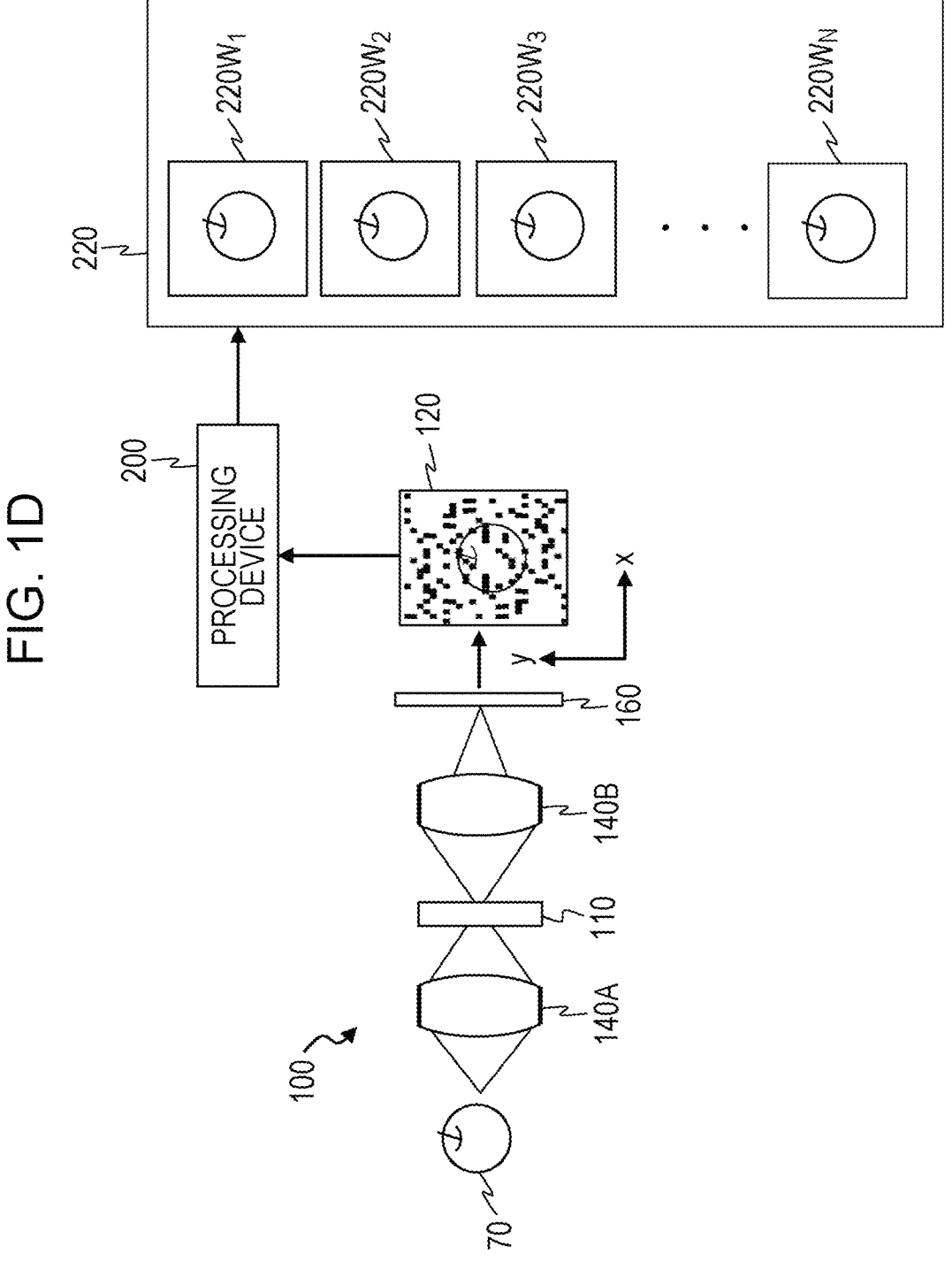
FIG. 1D is a schematic view of a third modification of the exemplary hyperspectral imaging system.

The filter array 110 may be arranged away from the image sensor 160. FIGS. 1B to 1D each illustrate a configuration example of the imaging device 100 in which the filter array 110 is arranged away from the image sensor 160. In the example of FIG. 1B, the filter array 110 is arranged at a position between the optical system 140 and the image sensor 160 and away from the image sensor 160. In the example of FIG. 1C, the filter array 110 is arranged between the object 70 and the optical system 140. In the example of FIG. 1D, the imaging device 100 includes two optical systems 140A and 140B, and the filter array 110 is arranged between those two optical systems. As seen from the above-mentioned examples, an optical system including one or more lenses may be arranged between the filter array 110 and the image sensor 160.

The image sensor 160 is a monochrome optical detector including light detection elements (also called "pixels" in this Specification) that are two-dimensionally arrayed. The image sensor 160 may be, for example, a CCD (Charge-Coupled Device). a CMOS (Complementary Metal Oxide Semiconductor) sensor, an infrared array sensor, a tera-hertz array sensor, or a millimeter-wave array sensor. The light detection elements each include, for example, a photodiode. The image sensor 160 is not always required to be a monochrome sensor. A color sensor including, for example, an R/G/B, R/G/B/IR, or R/G/B/W filter may also be used. Using the color sensor can increase an amount of information regarding wavelength and can improve accuracy in reconstruction of the spectral image 220. The target wavelength range to be detected may be determined as desired and may be a wavelength range covering an ultraviolet, near-infrared, mid-infrared, far-infrared, or microwave/electric wave range without being limited to a visible wavelength range.

The processing device 200 is a computer including a processor and a storage medium such as a memory. The processing device 200 generates, based on an image 120 obtained by the image sensor 160, data of the spectral images $220W_1$, $220W_2$, . . . , $220W_N$ including the information in the wavelength bands in a one-to-one relation.

Figure 2A:
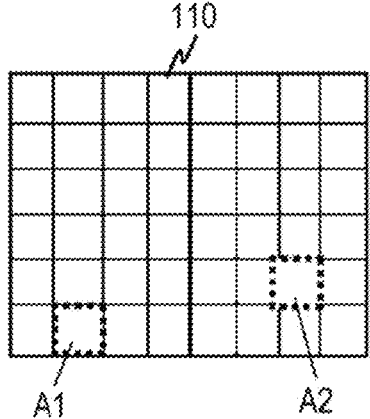
FIG. 2A is a schematic view illustrating an example of a filter array.

FIG. 2A is a schematic view illustrating an example of the filter array 110. The filter array 110 includes two-dimensionally arrayed regions. In this Specification, those regions are each also referred to as a "cell" in some cases. An optical filter with an individually set spectral transmittance is arranged in each of the regions. The spectral transmittance is expressed by a function $T(\lambda)$ where $\lambda$ denotes a wavelength of the incident light. The spectral transmittance $T(\lambda)$ may have a value greater than or equal to 0 and smaller than or equal to 1.

In the example illustrated in FIG. 2A, the filter array 110 includes 48 rectangular regions arrayed in 6 rows and 8 columns. Such an array is merely illustrative, and a larger number of regions than in the example may be prepared in practical use. The number of regions may be comparable to, for example, the number of pixels of the image sensor 160. The number of filters included in the filter array 110 is selectively determined from a range of several tens to several tens of millions depending on the application.

Figure 2B:
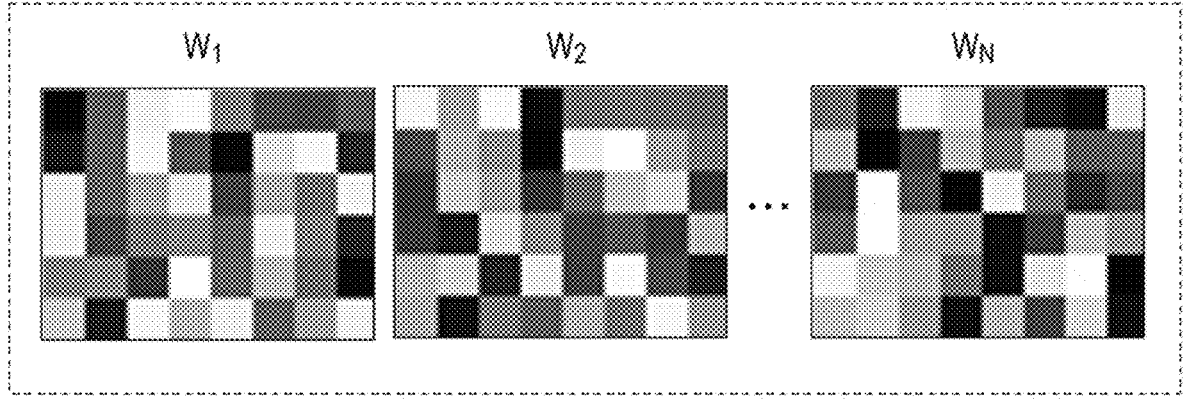
FIG. 2B illustrates an example of a spatial distribution of optical transmittance for each of wavelength bands $W_1$, $W_2$, . . . , $W_N$ included in a target wavelength range.

FIG. 2B illustrates an example of a spatial distribution of optical transmittance for each of the wavelength bands $W_1$, $W_2$, . . . , $W_N$ included in the target wavelength range. In the example illustrated in FIG. 2B, a difference in shade of gray in each region represents a difference in transmittance. The transmittance is higher in a lighter area and is lower in a darker area. As illustrated in FIG. 2B, the spatial distribution of the optical transmittance is different depending on the wavelength band.

Figure 2C:
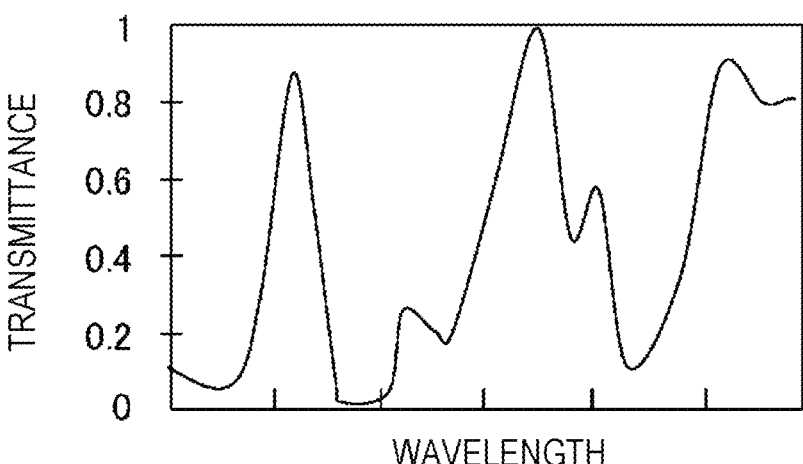
FIG. 2C illustrates an example of spectral transmittance in a region A1 included in the filter array illustrated in FIG. 2A.
Figure 2D:
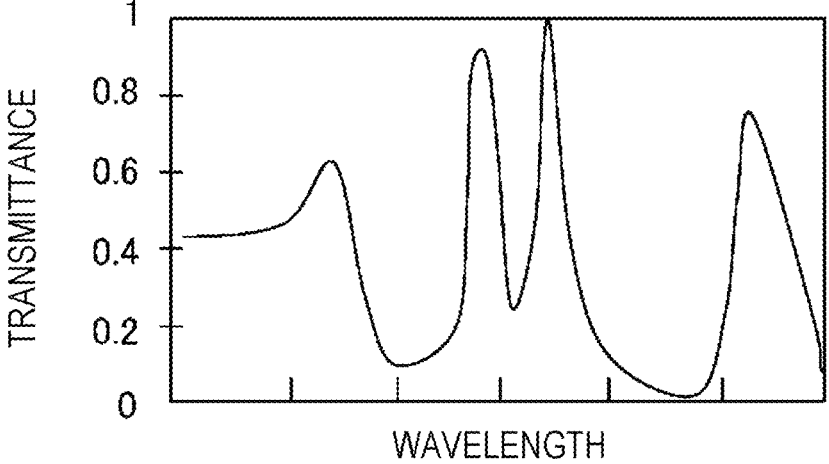
FIG. 2D illustrates an example of spectral transmittance in a region A2 included in the filter array illustrated in FIG. 2A.

FIGS. 2C and 2D illustrate respectively examples of the spectral transmittance in regions A1 and A2 included in the filter array 110 illustrated in FIG. 2A. The spectral transmittance in the region A1 and the spectral transmittance in the region A2 are different from each other. Thus, the spectral transmittance of the filter array 110 is different depending on the region. However, the spectral transmittances are not always required to be different in all the regions. In the filter array 110, the spectral transmittances are different in at least parts of the regions. The filter array 110 includes two or more filters that are different in spectral transmittance. In an example, the number of patterns of the spectral transmittance in the regions included in the filter array 110 may be equal to or greater than the number N of the wavelength bands included in the target wavelength range. The filter array 110 may be designed such that spectral transmittances in more than or equal to half of all the region are different from one another.

Figure 3A:
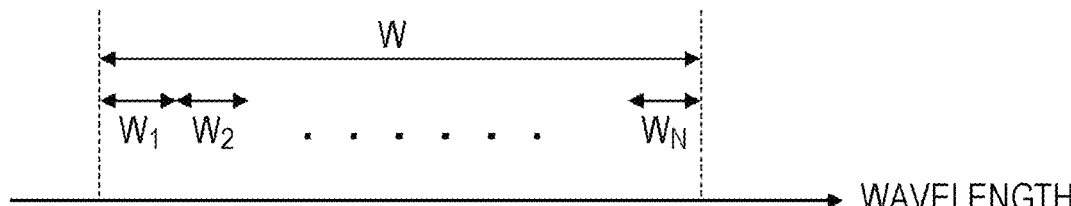
FIG. 3A illustrates an example of a relation between a target wavelength range W and the wavelength bands $W_1$, $W_2$, . . . , $W_N$ included therein.
Figure 3B:
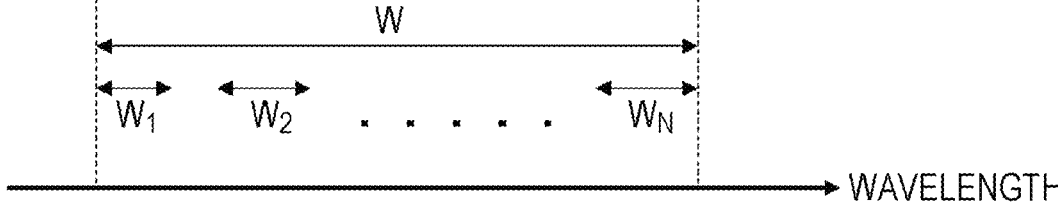
FIG. 3B illustrates another example of the relation between the target wavelength range W and the wavelength bands $W_1$, $W_2$, . . . , $W_N$ included therein.

FIGS. 3A and 3B are each an explanatory view illustrating a relation between a target wavelength range W and the wavelength bands $W_1$, $W_2$, . . . , $W_N$ included therein. The target wavelength range W may be set to various ranges depending on the application. The target wavelength range W may be, for example, a visible wavelength range of longer than or equal to about 400 nm and shorter than or equal to about 700 nm, a near-infrared wavelength range of longer than or equal to about 700 nm and shorter than or equal to about 2500 nm, or a near-ultraviolet wavelength range of longer than or equal to about 10 nm and shorter than or equal to about 400 nm. Alternatively, the target wavelength range W may be a mid-infrared, far-infrared, tera-hertz wave, or electric wave (such as millimeter wave) range. Thus, the wavelength range to be used is not limited to the visible light range. In this Specification, for convenience of explanation, invisible light, such as a near ultraviolet ray, a near-infrared ray, or an electric wave, is also called "light" in addition to visible light.

In the example illustrated in FIG. 3A, N is assumed to be an arbitrary integer greater than or equal to 4, and wavelength ranges resulting from dividing the target wavelength range W into N equal parts are given as the wavelength bands $W_1$, $W_2$, . . . , $W_N$. However, the present disclosure is not limited to that example. The wavelength bands included in the target wavelength range W may be set as desired. For instance, the wavelength bands may have nonuniform band widths. A gap or an overlap may exist between adjacent two of the wavelength bands. In the example illustrated in FIG. 3B, the wavelength bands have different band widths, and a gap exists between adjacent two of the wavelength bands. Thus, the wavelength bands just need to be different from each other, and a manner of determining the wavelength bands may be selected as desired.

Figure 4A:
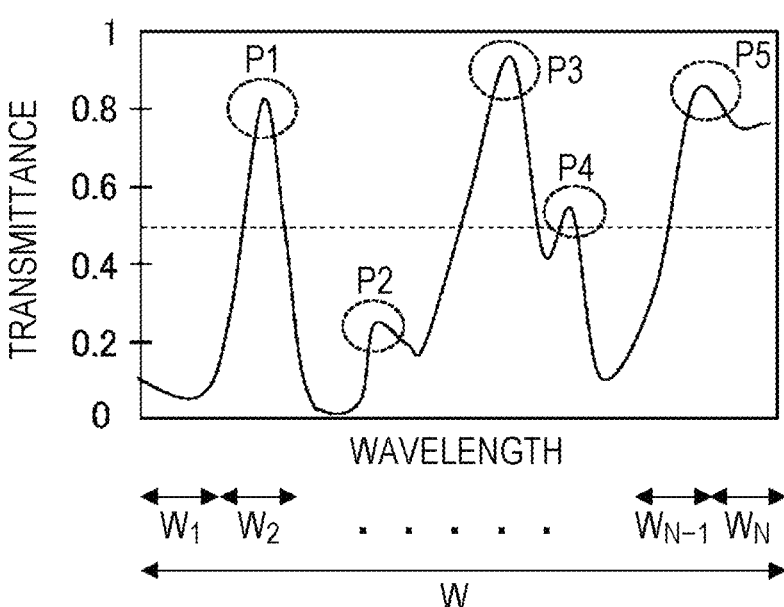
FIG. 4A is an explanatory view illustrating characteristics of spectral transmittance in a certain region of the filter array.

FIG. 4A is an explanatory view illustrating characteristics of the spectral transmittance in a certain region of the filter array 110. In the example illustrated in FIG. 4A, the spectral transmittance has local maximum values P1 to P5 and local minimum values with respect to wavelengths in the target wavelength range W. In the example illustrated in FIG. 4A, the spectral transmittance is normalized such that a maximum value of the spectral transmittance in the target wavelength range W is 1 and a minimum value is 0. In the example illustrated in FIG. 4A, the spectral transmittance has local maximum values in some wavelength ranges, for example, the wavelength band $W_2$ and the wavelength band $W_{N-1}$. Thus, the spectral transmittance in each region has local maximum values in at least two among the wavelength bands $W_1$ to $W_N$. In the example illustrated in FIG. 4A, the local maximum values P1, P3, P4, and P5 are greater than or equal to 0.5.

As described above, the optical transmittance in each region is different depending on the wavelength. Accordingly, the filter array 110 allows a component of the incident light in a certain wavelength range to pass therethrough in a large amount, but it does not allow another component of the incident light in another wavelength range in a so large amount. For instance, the transmittance may be greater than 0.5 for the light in k bands among N wavelength bands and may be smaller than 0.5 for the light in the remaining N-k wavelength bands. Here, k is an integer satisfying $2 \leq k < N$. If the incident light is white light including even visible wavelength components, the filter array 110 modulates the incident light to light with discrete intensity peaks in terms of wavelength for each region and outputs obtained multi-wavelength light in a superimposed fashion.

Figure 4B:
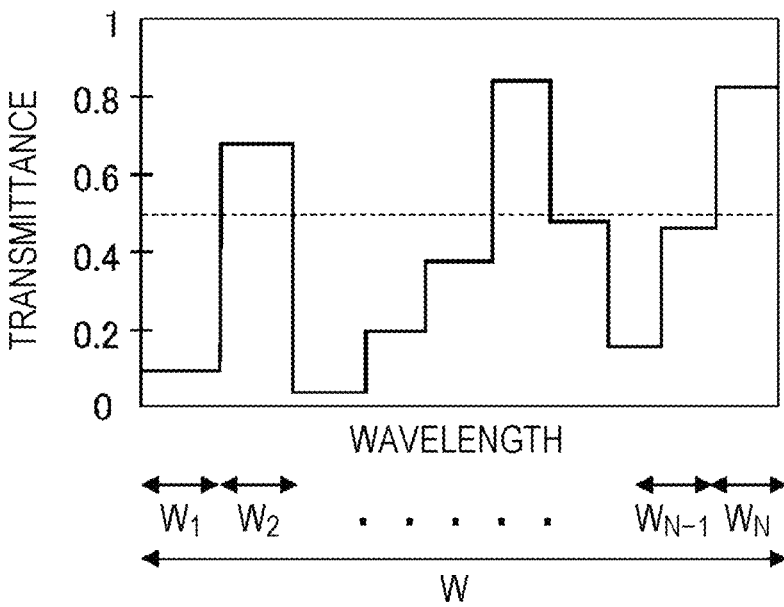
FIG. 4B illustrates a result of averaging the spectral transmittance illustrated in FIG. 4A for each of the wavelength bands $W_1$, $W_2$, . . . , $W_N$.

FIG. 4B illustrates, by way of example, a result of averaging the spectral transmittance illustrated in FIG. 4A for each of the wavelength bands $W_1$, $W_2$, . . . , $W_N$. The averaged transmittance is obtained by integrating the spectral transmittance $T(\lambda)$ for each wavelength band and dividing an integrated value by the band width of the relevant wavelength band. In this Specification, a value of the transmittance averaged for each wavelength band as mentioned above is defined as the transmittance in the relevant wavelength band. In the illustrated example, the transmittance is remarkably high in three wavelength ranges taking the local maximum values P1, P3, and P5. Particularly, the transmittance exceeds 0.8 in two wavelength ranges taking the local maximum values P3 and P5.

The examples illustrated in FIGS. 2A to 2D are premised on the transmittance distribution with a gray scale in which the transmittance in each region can take an arbitrary value of greater than or equal to 0 and smaller than or equal to 1. However, it is not always required to use the transmittance distribution with a gray scale. For instance, a transmittance distribution with a binary scale in which the transmittance in each region can take either one of a value of substantially 0 or a value of substantially 1 may also be used. In the case of the transmittance distribution with a binary scale, each region allows most part of light in at least two of the wavelength ranges included in the target wavelength range to pass therethrough and does not allow most part of light in the remaining wavelength ranges to pass therethrough. Here, the wording "most part" indicates part of greater than or equal to 80%.

Part of all cells, for example, a half of the cells, may be replaced with transparent regions. The transparent regions allow the lights in all the wavelength bands $W_1$ to $W_N$ included in the target wavelength range W to pass therethrough with a comparable high transmittance, for example, a transmittance of greater than or equal to 80%. In such a configuration, the transparent regions may be arranged in, for example, a checkerboard pattern. In other words, the region with the optical transmittance being different depending on the wavelength and the transparent region may be alternately arrayed in two array directions of the regions in the filter array 110.

Data representing the above-described spatial distribution of the spectral transmittance of the filter array 110 is obtained in advance as design data or with actual calibration and is stored in the storage medium included in the processing device 200. That data is utilized in a calculation process described later.

The filter array 110 may be formed using, for example, a multilayer film, an organic material, a grating structure, or a microstructure containing a metal. When the multilayer film is used, a dielectric multilayer film or a multilayer film containing a metal layer may be used, for example. In this case, the multilayer film is formed such that at least one of a thickness, a material, or a layer laminating order of the multilayer film is different for each cell. In such a manner, spectral characteristics different depending on the cell can be realized. Using the multilayer film enables sharp rising and falling of the spectral transmittance to be realized. The configuration using the organic material may be realized by selecting different pigments or dyes to be contained in the cells, or by laminating different types of materials for each cell. The configuration using the grating structure may be realized by forming individual grating structures to be different in grating pitch or depth for each cell. When the microstructure containing the metal is used, the microstructure can be fabricated by utilizing dispersion of light due to the plasmon effect.

An example of signal processing executed by the processing device 200 will be described below. The processing device 200 reconstructs the multiwavelength spectral image 220 based on both the image 120 output from the image sensor 160 and the spatial distribution characteristics of the transmittance of the filter array 110 for each wavelength. Here, the word "multiwavelength" indicates wavelength ranges in larger number than, for example, three-color wavelength ranges of RGB that are obtained by a usual color camera. The number of those wavelength ranges may be, for example, greater than or equal to 4 and smaller than or equal to about 100. The number of the wavelength ranges is referred to as the "band number". The band number may exceed 100 depending on the application.

Data to be acquired is data of the spectral image 220, and that data is denoted by f Assuming the band number to be N, f is data resulting from integrating the image data $f_1$, $f_2$, . . . , $f_N$ in the individual bands. Here, as illustrated in FIG. 1A, a horizontal direction of the image is assumed to be an x-direction, and a vertical direction of the image is assumed to be a y-direction. Assuming that the number of pixels in the x-direction of the image data to be acquired is denoted by n and the number of pixels in the y-direction is denoted by m, each of the image data $f_1$, $f_2$, . . . , $f_N$ is two-dimensional data of n×m pixels. Accordingly, the data f is three-dimensional data with the number of elements being n×m×N. This three-dimensional data is referred to as a "hyperspectral data cube" or a "hyperspectral cube". On the other hand, the number of elements of data g of the image 120 obtained after coding and multiplexing by the filter array 110 is n×m. The data g can be expressed by the following equation (1).

$$g = Hf = H \begin{bmatrix} f_1 \\ f_2 \\ \vdots \\ f_N \end{bmatrix} \tag{1}$$

Here, each of $f_1$, $f_2$, . . . , $f_N$ is the data including (n×m) elements. Speaking exactly, therefore, a vector on the right side is a one-dimensional vector of (n×m×N) rows and one column. The vector g is expressed and calculated through conversion to a one-dimensional vector of (n×m) rows and one column. A matrix H represents conversion of coding and intensity-modulating each component $f_1$, $f_2$, . . . , $f_N$ of a vector fin accordance with coding information (hereinafter also referred to as "mask information") per wavelength band and adding the modulated results. Thus, H is a matrix of (n×m) rows and (n×m×N) columns. In this Specification, the matrix H is referred to as a "system matrix") in some cases.

It seems that, if the vector g and the matrix H are given, f can be calculated by solving an inverse problem of the equation (1). However, because the number (n×m×N) of elements of the data f to be acquired is greater than the number (n×m) of elements of the data g, that problem is an ill-posed problem and cannot be solved as it is. In consideration of the above point, the processing device 200 determines a solution with a compressed sensing method by utilizing redundancy of the image included in the data f. More specifically, the data f to be acquired is estimated by solving the following equation (2).

$$f' = \underset{f}{\operatorname{argmin}} \{\|g - Hf\|_{l_2} + \tau \Phi(f)\} \qquad (2)$$

Here, f denotes estimated data off. The first term in the parenthesis of the above equation denotes a deviation between an estimated result Hf and the obtained data g, namely the so-called residual term. While the square sum is used here as the residual term, an absolute value or a square root of sum of squares, for example, may be used as the residual term. The second term in the parenthesis is a regularization term or a stabilization term. The equation (2) indicates that f minimizing the sum of the first term and the second term is to be determined. The processing device 200 can calculate the final solution f by converging the solution with recursive and iterative calculation.

The first term in the parenthesis of the equation (2) indicates calculation of determining the square sum of the difference between the obtained data g and Hf resulting from transforming fin an estimation process with the matrix H. $\Phi(f)$ in the second term represents a restriction condition in regularization of f and is a function reflecting sparse information of the estimated data. This function is effective in smoothing or stabilizing the estimated data. The regularization term may be expressed with, for example, discrete cosine transform (DCT), wavelet transform, Fourier transform, or total variation (TV) off. For instance, when the total variation is used, stable estimated data can be obtained while an influence of noise of the observed data g is suppressed. Sparseness of the object 70 in a space of each regularization term is different depending on the texture of the object 70. The regularization term making the texture of the object 70 more sparse in the space of the regularization term may be selected. Alternatively, two or more regularization terms may be included in the calculation. $\tau$ is a weight factor. As the weight factor $\tau$ increases, a reduction of redundant data increases and a compression rate increases. As the weight factor $\tau$ decreases, convergence to the solution weakens. The weight factor $\tau$ is set to an appropriate value at which f is converged to some extent without causing excessive compression.

With the configurations illustrated in FIGS. 1B and 1C, an image after being coded by the filter array 110 is obtained in a blurred state on the imaging surface of the image sensor 160. Accordingly, the spectral image 220 can be reconstructed by holding blur information in advance and by reflecting the blur information on the above-described system matrix H. Here, the blur information is expressed by a PSF (Point Spread Function). The PSF is a function specifying an extent of spread to peripheral pixels around a point image. For instance, when a point image corresponding to one pixel on the image spreads to an area of k×k pixels around the one pixel due to a blur, the PSF may be specified as a group, i.e., a matrix, of coefficients indicating influences on light intensities of the individual pixels in the area. The spectral image 220 can be reconstructed by reflecting the influences of the blur of a coding pattern, caused by the PSF, on the system matrix H. While a layout position of the filter array 110 can be selected as desired, a position at which the coding pattern of the filter array 110 does not disappear due to excessive dispersion may be selected.

With the above-described configuration, the hyperspectral data cubes representing two-dimensional images for all the wavelength bands $W_1$ to $W_N$ included in the target wavelength range W are generated as illustrated in FIGS. 3A and 3B. Depending on the application, however, the images for all those wavelength bands are not required. In such a case, generating the images with high wavelength resolution for all the wavelength bands is inefficient.

Figure 5:
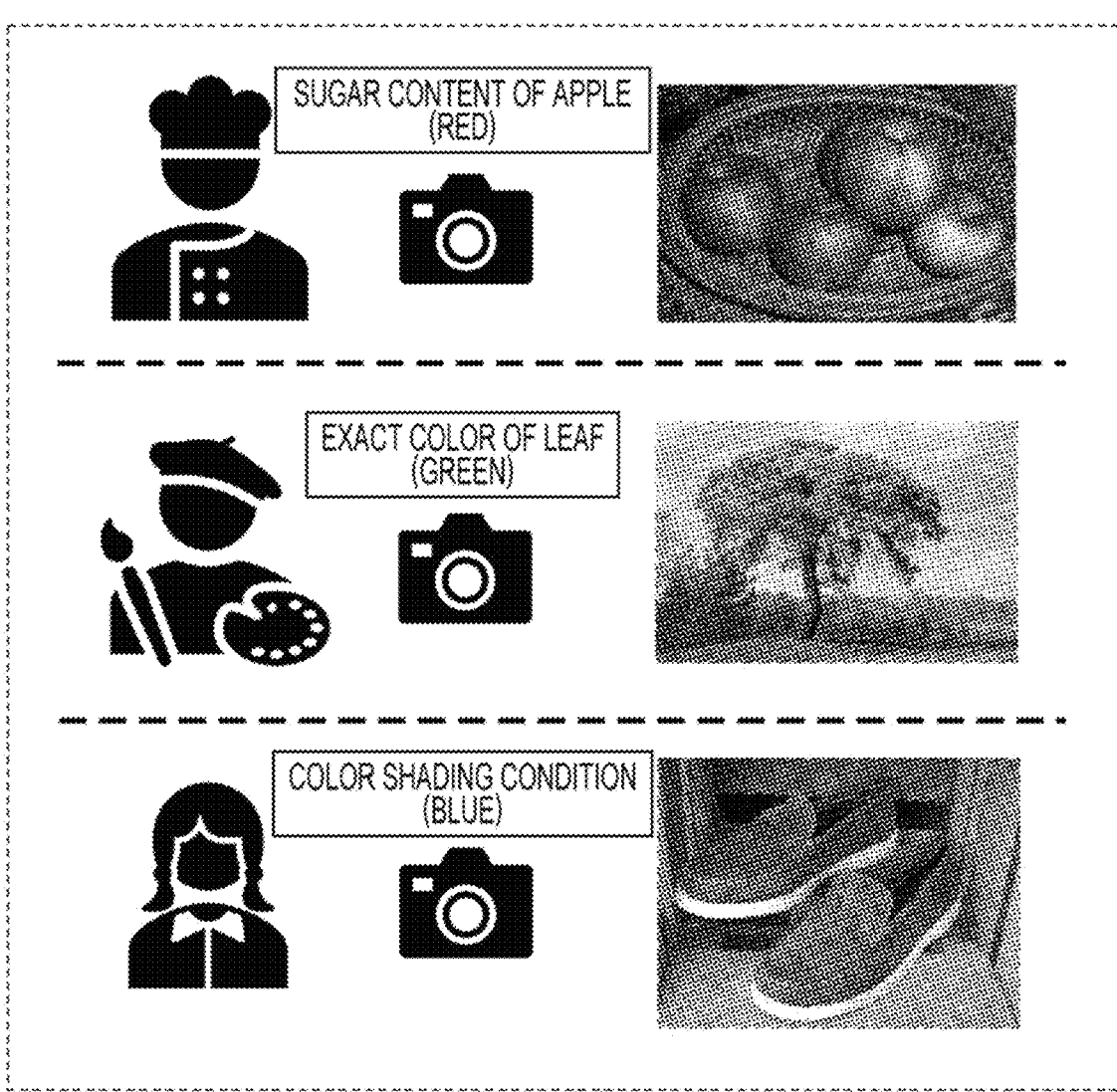
FIG. 5 is a schematic view illustrating scenes where a hyperspectral camera is used.

FIG. 5 is a schematic view illustrating scenes where a hyperspectral camera is used. In one scene, a user desires to obtain color information in a red wavelength band, e.g., a wavelength band of longer than or equal to 600 nm and shorter than or equal to 700 nm, for the purpose of estimating a sugar content of an apple. In another scene, a user desires to obtain color information in a green wavelength band, e.g., a wavelength band of longer than or equal to 500 nm and shorter than or equal to 600 nm, for the purpose of finding an exact spectrum of a leaf. In still another scene, a user desires to obtain color information in a blue wavelength band, e.g., a wavelength band of longer than or equal to 400 nm and shorter than or equal to 500 nm, for the purpose of finding a color fading condition of a blue commodity.

To obtain color information in different wavelength ranges in the above-described scenes, one of the following methods (1) or (2) is used in the related-art hyperspectral camera. (1) Utilize an image sensor capable of independently obtaining information in each of the wavelength ranges.

(2) Obtain color information widely with a camera capable of obtaining information over a wide wavelength range and display only the information in a necessary wavelength range.

According to the method (1), an additional image sensor needs to be prepared in a different application in which color information different from that required in some application is required.

According to the method (2), color information in a wider wavelength range than a required wavelength range is obtained, and an image is generated for each of many wavelength bands included in the wide wavelength range. Therefore, a lot of calculation is executed for unnecessary wavelength ranges as well, and the calculation cost increases beyond an allowable level.

In consideration of the above point, the embodiment of the present disclosure is designed such that the user can designate, based on image data obtained by a hyperspectral imaging device, one or more sub-wavelength ranges each being part of the target wavelength range W. A signal processing device generates hyperspectral data cubes representing two-dimensional images for wavelength bands included in the one or more designated sub-wavelength ranges. As a result, detailed spectral information in the sub-wavelength range(s) demanded by the user can be obtained while the calculation cost is suppressed.

Figure 6A:
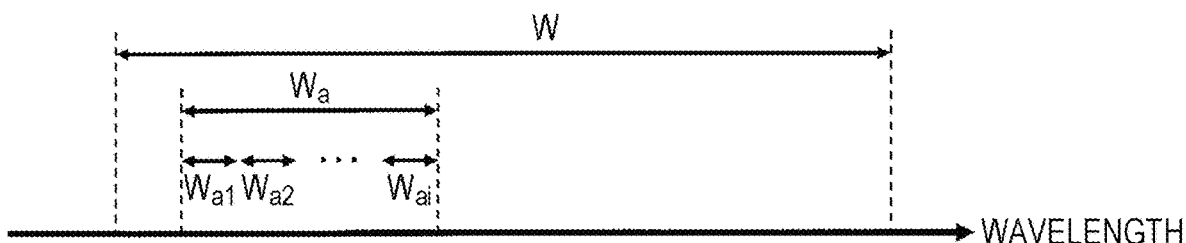
FIG. 6A illustrates an example of the target wavelength range W and a designated sub-wavelength range Wa.

FIG. 6A illustrates an example of the target wavelength range W and a designated sub-wavelength range Wa. In this example, only one sub-wavelength range Wa is designated. The sub-wavelength range Wa is part of the target wavelength range W and includes wavelength bands $W_{a1}$, $W_{a2}, \ldots, W_{ai}$. Here, "i" denotes the number of wavelength bands included in the sub-wavelength range Wa. The signal processing device generates the hyperspectral data cube representing the two-dimensional image for each of the wavelength bands $W_{a1}, W_{a2}, \ldots, W_{ai}$.

Figure 6B:
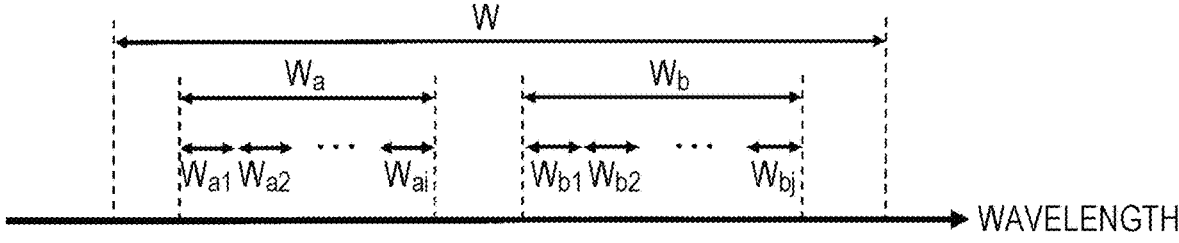
FIG. 6B illustrates an example of the case of designating, in addition to a first sub-wavelength range, a second sub-wavelength range.

FIG. 6B illustrates an example of the case of designating, in addition to a first sub-wavelength range $W_a$, a second sub-wavelength range $W_b$. The first sub-wavelength range $W_a$ and the second sub-wavelength range $W_b$ are away from each other and are each included in the target wavelength range W. The second sub-wavelength range $W_b$ includes wavelength bands $W_{b1}, W_{b2}, \ldots, W_{bj}$. Here, "j" denotes the number of wavelength bands included in the second sub-wavelength range Wb. Thus, two or more sub-wavelength ranges may be designated.

As described above, the signal processing device generates, based on the image data generated by the imaging device, the images of the wavelength bands included in the designated sub-wavelength range. The generated images of the wavelength bands are displayed on a display. That operation can reduce the calculation cost that is taken to generate unnecessary spectral images in the application scene of interest.

Embodiments of the Present Disclosure are Summarized as Follows

A signal processing method according to one embodiment of the present disclosure is executed by a computer. The method includes obtaining compressed image data including two-dimensional image information that is obtained by compressing hyperspectral information corresponding to wavelength bands included in a target wavelength range, obtaining setting data including information designating one or more sub-wavelength ranges that are parts of the target wavelength range, and generating, based on the compressed image data, two-dimensional images corresponding to wavelength bands included in the one or more sub-wavelength ranges.

The wording "hyperspectral information in a target wavelength range" indicates information of images corresponding to wavelength bands included in a predetermined target wavelength range. The wording "compressing hyperspectral information" includes not only compressing pieces of image information in wavelength bands into one monochrome two-dimensional image by using a coding element such as the above-mentioned the filter array 110, but also compressing pieces of image information in wavelength bands into one monochrome two-dimensional image through a software process.

According to the above-described method, data of two-dimensional images corresponding to the wavelength bands, namely hyperspectral data cubes, included in the one or more sub-wavelength ranges designated by a user, for example, can be generated. Therefore, the above-described method can generate only necessary hyperspectral data cubes depending on the application or the purpose.

The wavelength bands included in the target wavelength rang may be four or more wavelength bands included in the target wavelength range, and the two-dimensional image information may be data items of pixels included in the compressed image data. Information items corresponding to four or more wavelength bands may be superimposed in each of the data items of the pixels. In other words, each of the data items of the pixels of the compressed image data may include one value in which the pieces of information in the four or more wavelength bands included in the target wavelength range are superimposed. Pieces of information in wavelength bands of more than or equal to 10 or less than or equal to 100 may be superimposed in the data for each of the pixels of the compressed image data depending on the application.

The setting data may include information designating one or more wavelength resolutions corresponding to the one or more sub-wavelength ranges. The two-dimensional images may be generated with the one or more designated wavelength resolutions. With the feature described above, the user can designate, in addition to the sub-wavelength range, the wavelength resolution for each sub-wavelength range. Therefore, the user can make flexible adjustment such as increasing the wavelength resolution in the sub-wavelength range where detailed spectral information is required.

The one or more sub-wavelength ranges may include a first sub-wavelength range and a second sub-wavelength range. The two-dimensional images may include two-dimensional images corresponding to the first sub-wavelength range and two-dimensional images corresponding to the second sub-wavelength range.

The one or more sub-wavelength ranges may include a first sub-wavelength range and a second sub-wavelength range. The one or more wavelength resolutions may include a wavelength resolution corresponding to the first sub-wavelength range and a wavelength resolution corresponding to the second sub-wavelength range, the wavelength resolution corresponding to the first sub-wavelength range and the wavelength resolution corresponding to the second sub-wavelength range being determined independently. The two-dimensional images may include two-dimensional images corresponding to the first sub-wavelength range and generated with the wavelength resolution corresponding to the first sub-wavelength range, and two-dimensional images corresponding to the second sub-wavelength range and generated with the wavelength resolution corresponding to the second sub-wavelength range.

The first sub-wavelength range and the second sub-wavelength range may be away from each other. Alternatively, the first sub-wavelength range and the second sub-wavelength range may be adjacent to each other or may partially overlap each other.

The method may further include displaying, on a display connected to the computer, a graphical user interface (GUI) on which the user inputs the setting data. On the GUI displayed, the user can easily perform operations of designating the sub-wavelength range and designating the wavelength resolution for each sub-wavelength range.

The method may further include displaying the two-dimensional images on a display connected to the computer. This feature enables the user to easily check the spectral image generated for each of the wavelength bands.

The compressed image data may be generated by taking an image with an image sensor and a filter array including optical filters different in spectral transmittance and an image sensor. The method may further include obtaining mask data reflecting a spatial distribution of the spectral transmittance of the filter array. The two-dimensional images may be generated based on the compressed image data and the mask data.

The method may further include obtaining mask data including information of mask images that are obtained by taking images of backgrounds with the image sensor through the filter array, the backgrounds corresponding to unit bands included in the target wavelength range. The two-dimensional images may be generated based on the compressed image data and the mask data.

The mask data may be data specifying, for example, the matrix H in the above-described equation (2). The form of the mask data may be different depending on the configuration of the imaging system. The mask data may represent the spatial distribution of the spectral transmittance of the filter array or information to calculate the spatial distribution of the spectral transmittance of the filter array. For instance, the mask data may include information of the background image for each unit band in addition to the above-described information of the mask images. Information of the transmittance distribution can be obtained for each unit band by dividing the mask image by the background image per pixel. The mask data may include only the information of the mask images. The mask images represent a distribution of values resulting from multiplying the transmittances of the filter array by sensitivity of the image sensor. In a configuration in which the filter array and the image sensor are arranged to closely face each other, that type of mask data may be used.

The mask data may include mask information. The mask information may represent a spatial distribution of transmittance of the filter array corresponding to each of unit bands included in the target wavelength range. The method may further include generating combined mask information by combining parts of the mask information, the parts corresponding to unit bands included in a not-designated wavelength range in the target wavelength range other than the one or more sub-wavelength ranges, and generating a combined image corresponding to the not-designated wavelength range based on both the compressed image data and the combined mask information.

The method may further include generating a combined mask image by combining the mask images for the unit bands included in the not-designated wavelength range in the target wavelength range other than the one or more designated sub-wavelength ranges, and generating combined image data for the not-designated wavelength range based on both the compressed image data and the combined mask image.

According to the above-described method, a detailed spectral image is not generated for the not-designated wavelength range, and the detailed spectral image is generated only for the designated sub-wavelength range. Therefore, the calculation time necessary for generating the spectral images can be shortened.

The mask data may further include information of background images that are obtained by taking images of backgrounds with the image sensor without interposition of the filter array. The method may further include generating a combined background image resulting from combining the background images. The combined image may be generated based on the compressed image data, the combined mask image, and the combined background image.

The mask data may include background images and mask images. The background images may be obtained, for example, by capturing backgrounds with the image sensor without interposition of the filter array, the background images corresponding one-to-one to the backgrounds. The mask images may be obtained by capturing the backgrounds with the image sensor through the filter array, the mask images corresponding one-to-one to the backgrounds. The combined mask information may be generated based on the mask images and the background images.

The method may further include displaying the combined image on a display connected to the computer. This feature enables the user to easily check a rough image for the not-designated wavelength range.

The mask data may include mask information. The mask information may represent a spatial distribution of transmittance of the filter array corresponding to each of unit bands included in the target wavelength range. The setting data may include information designating large sub-wavelength ranges each being part of the target wavelength range and small sub-wavelength ranges included in one of the large sub-wavelength ranges. The method may further include generating, for each of the large sub-wavelength ranges, first combined mask information by combining parts of the mask information, the parts corresponding to unit bands included in each of the large sub-wavelength ranges, and generating a first combined image for each of the large sub-wavelength ranges based on both the compressed image data and the first combined mask information. The two-dimensional images may correspond to the small sub-wavelength ranges and are based on the first combined image. The method may further include generating, for each of the small sub-wavelength ranges, second combined mask information resulting from combining pieces of the mask information for the unit bands included in the small sub-wavelength range, and generating, for each of the small sub-wavelength ranges, a second combined image based on both the first combined image for the at least one of the designated large sub-wavelength ranges and the second combined mask information.

According to the above-described method, it is possible to generate the combined image for each of the large sub-wavelength ranges included in the target wavelength range and for each of the small sub-wavelength ranges included in at least one of the large sub-wavelength ranges, those large and small sub-wavelength ranges being designated by the user, for example. Therefore, the user can make flexible adjustment such as setting the small sub-wavelength ranges only for the wavelength range where detailed color information is necessary and setting only the large sub-wavelength ranges for the wavelength range where detailed color information is not necessary.

The target wavelength range may include a visible wavelength range. The method may further include generating, based on the compressed image data and the combined mask information, an image corresponding to a red wavelength range, an image corresponding to a green wavelength range, and an image corresponding to a blue wavelength range, and displaying, on a display connected to the computer, an RGB image based on the image corresponding to the red wavelength range, the image corresponding to the green wavelength range, and the image corresponding to the blue wavelength range. This feature enables the user to check the RGB image of an object in addition to the detailed spectral image for the designated sub-wavelength range.

A method according to another embodiment of the present disclosure is a method of generating mask data. The mask data is used to generate spectral image data for each wavelength band from compressed image data obtained by an imaging device that includes a filter array including optical filters different in spectral transmittance. In other words, the method is to generate the mask data, which is used to generate the spectral image data for each wavelength band, from the compressed image data obtained by the imaging device that includes the filter array including plural types of optical filters different in spectral transmittance. The method includes obtaining first mask data to generate first spectral image data corresponding to a first wavelength band group in a target wavelength range, obtaining setting data to designate one or more sub-wavelength ranges that are parts of the target wavelength range, and generating, based on the first mask data and the setting data, second mask data to generate second spectral image data corresponding to a second wavelength band group in the one or more sub-wavelength ranges.

The first wavelength band group may be a set of all or parts of the wavelength bands included in the target wavelength range. The second wavelength band group may be a set of all or parts of the wavelength bands included in the sub-wavelength range. The first wavelength band group and the second wavelength band group may be each an assembly of combined bands in each of which two or more unit wavelength bands are combined. When such band combination is performed, a conversion process of the mask data is executed depending on the form of the band combination. The setting data may include information regarding the form of the band combination, the information being used to execute the conversion process of the mask data.

The first mask data may include first mask information reflecting a spatial distribution of spectral transmittance of the filter array corresponding to the first wavelength band group. The second mask data may include second mask information reflecting a spatial distribution of spectral transmittance of the filter array corresponding to the second wavelength band group.

The second mask data may further include third mask information obtained by combining pieces of information. The pieces of the information each reflect the spatial distribution of the spectral transmittance in a corresponding wavelength band that is included in a not-designated wavelength range in the target wavelength range other than the one or more sub-wavelength ranges.

A signal processing device according to still another embodiment of the present disclosure includes a processor and a memory storing a computer program executed by the processor. The computer program causes the processor to execute obtaining compressed image data including two-dimensional image information that is obtained by compressing hyperspectral information in a target wavelength range, obtaining setting data to designate one or more sub-wavelength ranges that are parts of the target wavelength range, and generating, based on the compressed image data, two-dimensional images corresponding to wavelength bands included in the one or more sub-wavelength ranges.

A signal processing device according to still another embodiment of the present disclosure includes a processor and a memory storing a computer program executed by the processor. The computer program causes the processor to execute obtaining first mask data to generate first spectral image data corresponding to a first wavelength band group in a target wavelength range, obtaining setting data to designate one or more sub-wavelength ranges that are parts of the target wavelength range, and generating, based on the first mask data and the setting data, second mask data to generate second spectral image data corresponding to a second wavelength band group in the one or more sub-wavelength ranges.

An imaging device according to still another embodiment of the present disclosure includes the above-described signal processing device and an imaging device generating the compressed image data.

A computer program according to still another embodiment of the present disclosure includes causing a computer to execute obtaining compressed image data including two-dimensional image information that is obtained by compressing hyperspectral information corresponding to wavelength bands included in a target wavelength range, obtaining setting data to designate one or more sub-wavelength ranges that are parts of the target wavelength range, and generating, based on the compressed image data, two-dimensional images corresponding to wavelength bands included in the one or more sub-wavelength ranges.

A computer program according to still another embodiment of the present disclosure includes causing a computer to execute obtaining first mask data to generate first spectral image data corresponding to a first wavelength band group in a target wavelength range from compressed image data obtained by an imaging device that includes a filter array including plural types of optical filters different in spectral transmittance, obtaining setting data to designate one or more sub-wavelength ranges that are parts of the target wavelength range, and generating, based on the first mask data and the setting data, second mask data to generate second spectral image data corresponding to a second wavelength band group in the one or more sub-wavelength ranges.

A non-transitory computer-readable recording medium according to still another embodiment of the present disclosure stores a program causing a computer to execute processes including obtaining compressed image data including two-dimensional image information that is obtained by compressing hyperspectral information corresponding to wavelength included in a target wavelength range, obtaining setting data to designate one or more sub-wavelength ranges that are parts of the target wavelength range, and generating, based on the compressed image data, two-dimensional images corresponding to wavelength bands included in the one or more sub-wavelength ranges.

A non-transitory computer-readable recording medium according to still another embodiment of the present disclosure stores a program causing a computer to execute processes including obtaining first mask data to generate first spectral image data corresponding to a first wavelength band group in a target wavelength range, obtaining setting data to designate one or more sub-wavelength ranges that are parts of the target wavelength range, and generating, based on the first mask data and the setting data, second mask data to generate second spectral image data corresponding to a second wavelength band group in the one or more sub-wavelength ranges.

More specific embodiments of the present disclosure will be described below. However, detailed description more than a necessary level is omitted in some cases. For instance, detailed description of the already well-known matters and duplicate description of substantially the same components are omitted in some cases. This is intended to avoid the following description from becoming excessively redundant and to make those skilled in the art more easily understand the present disclosure. The inventors provide the attached drawings and the following description for allowing those skilled in the art to sufficiently understand the present disclosure, and the attached drawings and the following description are not purported to restrict the main subjects stated in Claims. In the following description, the same or similar constituent elements are denoted by the same reference signs. The following description is made using xyz-coordinates denoted in the drawings.

EMBODIMENT

Figure 7:
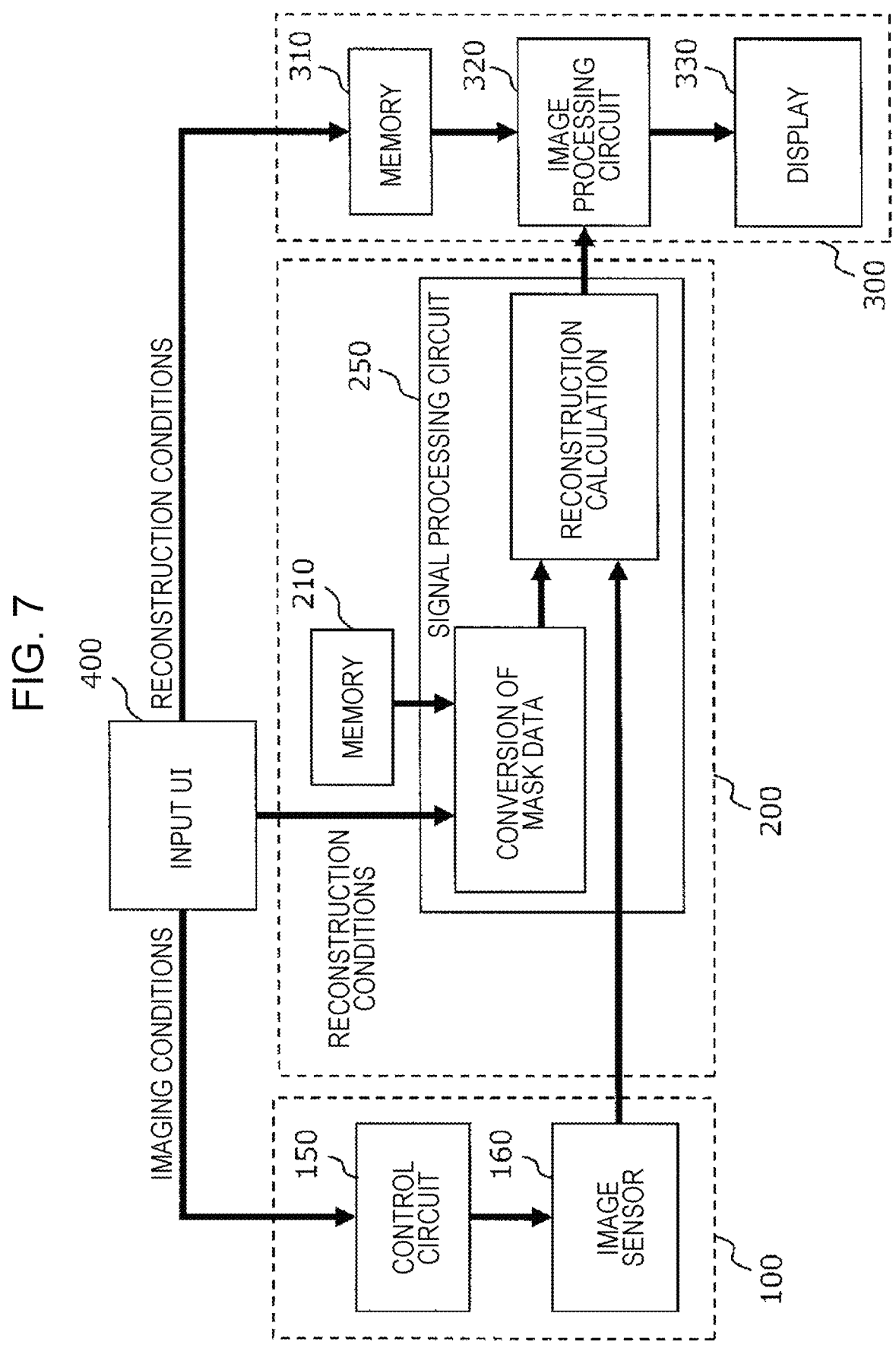
FIG. 7 illustrates a configuration of an imaging system according to an exemplary embodiment of the present disclosure.

FIG. 7 illustrates a configuration of an imaging system according to an exemplary embodiment of the present disclosure. The system includes an imaging device 100, a processing device 200, a display device 300, and an input user interface (UI) 400. The processing device 200 corresponds to the signal processing device according to the present disclosure.

The imaging device 100 includes an image sensor 160 and a control circuit 150 controlling the image sensor 160. Although not illustrated in FIG. 7, the imaging device 100 further includes a filter array 110 and at least one optical system 140 as illustrated in FIGS. 1A to 1D. The filter array 110 and the optical system 140 may be arranged as per illustrated in any of FIGS. 1A to 1D. The image sensor 160 obtains a monochrome image based on light of which intensity is modulated by the filter array 110 for each region. Pieces of information in the wavelength bands included in the target wavelength range W are superimposed in data of each pixel of the monochrome image. Accordingly, the monochrome image can be said as being an image resulting from compression of hyperspectral information in the target wavelength range W into a two-dimensional image. That monochrome image is an example of a "compressed image" in this Specification. Furthermore, in this Specification, the data representing the compressed image is referred to as "compressed image data".

The processing device 200 includes a signal processing circuit 250 and a memory 210 such as a RAM or a ROM. The signal processing circuit 250 may be an integrated circuit including a processor such as a CPU or a GPU. The signal processing circuit 250 executes a reconstruction process based on the compressed image data that is output from the image sensor 160. This reconstruction process is basically the same as that executed by the processing device 200 illustrated in FIGS. 1A to 1D, but in this embodiment, the reconstruction process is executed in accordance with reconstruction conditions input from the input UI 400. The signal processing circuit 250 generates the image data with high wavelength resolution only for the designated sub-wavelength range in the target wavelength range. Accordingly, the calculation time can be shortened. The memory 210 stores computer programs executed by the processor included in the signal processing circuit 250, various data referred to by the signal processing circuit 250, and various data generated by the signal processing circuit 250.

The display device 300 includes a memory 310, an image processing circuit 320, and a display 330. The memory 310 temporarily stores setting data representing the reconstruction conditions that are sent from the input UI 400. The image processing circuit 320 causes an image reconstructed by the signal processing circuit 250 to be displayed on the display 330 after executing necessary processes on the reconstructed image. The display 330 may be any suitable display such as a liquid-crystal or organic LED display, for example.

The input UI 400 includes hardware or software for setting various conditions such as imaging conditions and reconstruction conditions. The imaging conditions may include, for example, an image resolution, a gain, and an exposure time. The reconstruction conditions may include, for example, a lower limit wavelength and an upper limit wavelength of each sub-wavelength range, the number of wavelength bands included in each sub-wavelength range, and the number of calculations. The input imaging conditions are sent to the control circuit 150 of the imaging device 100. The control circuit 150 controls the image sensor 160 to take an image in accordance with the imaging conditions. Thus, the image sensor 160 generates the compressed image in which pieces of information in the wavelength bands included in the target wavelength range W are superimposed. The input reconstruction conditions are further sent to the signal processing circuit 250 and to the memory 310 to be recorded there. The signal processing circuit 250 executes the reconstruction process in accordance with the set reconstruction conditions and generates the hyperspectral data cubes for the designated sub-wavelength range. The image processing circuit 320 causes the display 330 to display the image for each of the wavelength bands included in the designated sub-wavelength range in accordance with the set reconstruction conditions.

In the reconstruction process, the signal processing circuit 250 uses mask data previously recorded on the memory 210 after converting the mask data as required in accordance with the input reconstruction conditions that are entered from the input UI 400. The mask data is data representing the spatial distribution of the spectral transmittance of the filter array 110 and includes information corresponding to the matrix H in the above-described equation (2). The generated spectral image is processed as required by the image processing circuit 320. The image processing circuit 320 causes the spectral image to be displayed on the display 330 after executing processes of, for example, determining a layout of the image in a screen, setting linkage with band information, and coloring the image corresponding to wavelengths.

In this embodiment, the signal processing circuit 250 generates the image for each of the wavelength bands only for at least one designated sub-wavelength range in the target wavelength range W. For the wavelength ranges in the target wavelength range W other than the designated sub-wavelength range, calculation is executed by regarding the continuous wavelength ranges as one collective wavelength range. Thus, the calculation cost can be suppressed. The signal processing circuit 250 may generate the image for each of the wavelength bands over the entirety of the target wavelength range W. In such a case, the image processing circuit 320 may extract data for the designated sub-wavelength range from the image data input from the signal processing circuit 250 and may display the extracted data.

Figure 8:
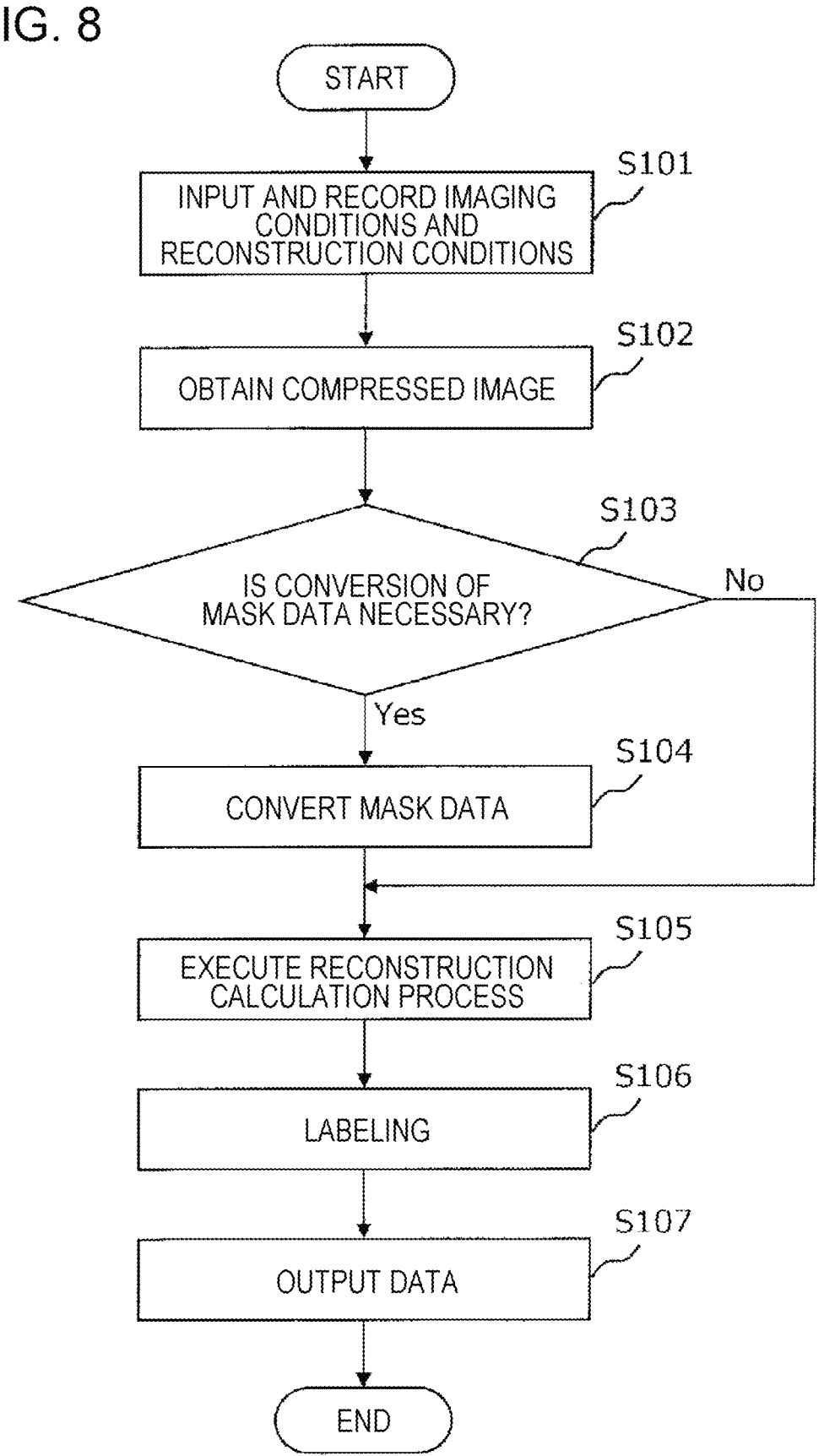
FIG. 8 is a flowchart illustrating operation of the system.

FIG. 8 is a flowchart illustrating operation of the system according to this embodiment. In this embodiment, first, the user inputs, in step S101, the imaging conditions and the reconstruction conditions through the input UI 400 (step S101). Data representing the input imaging conditions is sent to the control circuit 150. Data representing the input reconstruction conditions is sent to the signal processing circuit 250 and the memory 310. The memory 310 temporarily stores the reconstruction conditions. When the image is displayed, the stored reconstruction conditions are referred to confirm the linkage between the image and the set condition for the wavelength band. Then, the imaging device 100 takes an object image in accordance with the imaging conditions and obtains a compressed image (step S102).

After the compressed image is obtained, the signal processing circuit 250 determines, based on the input reconstruction conditions, whether conversion of the mask data is required (S103). If the conversion is necessary, the signal processing circuit 250 converts the mask data that is previously stored in the memory 210 (step S104). Here, the word "conversion" indicates that pieces of the mask information for the wavelength ranges are combined and are handled as the mask information for one wavelength range. Details of combination of the mask information will be described later with reference to FIG. 14. If the conversion is not necessary, step S104 is omitted. The signal processing circuit 250 executes the reconstruction process in accordance with the input reconstruction conditions by using the compressed image and the mask data after being converted as required (step S105). Thus, a spectral image is generated from the compressed image. Then, the image processing circuit 320 of the display device 300 links the generated spectral image with the reconstruction conditions stored in the memory 310 for labeling (step S106). For instance, the image processing circuit 320 generates image data in which a label indicating a corresponding wavelength range is added to each of the generated spectral images. Then, the image processing circuit 320 outputs the generated image data to the display 330 to be displayed thereon (step S107).

FIG. 9 illustrates an example of the mask data before the conversion, the mask data being stored in the memory 210. The mask data in the illustrated example includes mask information representing the spatial distribution of the transmittance for each of unit bands included in the target wavelength range. The mask data in the illustrated example includes the mask information for each of many unit bands divided per 1 nm and information regarding conditions in obtaining the mask information. Each of the unit bands is specified by a lower limit wavelength and an upper limit wavelength. The mask information includes a mask image and a background image. The mask images illustrated in FIG. 9 are obtained by taking images of backgrounds corresponding respectively to the unit bands with the image sensor 160 through the filter array 110. The background images are obtained by taking images of the backgrounds with the image sensor 160 without interposition of the filter array 110. Thus-obtained data of the mask images and the background images are recorded in advance for each unit band. The information regarding the conditions in obtaining the mask information includes information about an exposure time and a gain. In the example illustrated in FIG. 9, the data of the mask images and the background images are recorded for each of the unit bands with a width of 1 nm. The width of each unit band is not limited to 1 nm and may be determined as any desired value. When the background image has very high uniformity, the mask data does not need to include the information of the background image. For instance, in a configuration in which the image sensor 160 and the filter array 110 are integrated to closely face each other, since the mask information substantially matches the mask image, the mask data does not need to include the background image.

Examples of a graphical user interface (GUI) displayed in accordance with a program executing the above-described information processing will be described below with reference to FIGS. 10 to 13. Images providing those examples of the GUI are generated by the signal processing circuit 250 and the image processing circuit 320 and are displayed on the display 330.

Figure 10:
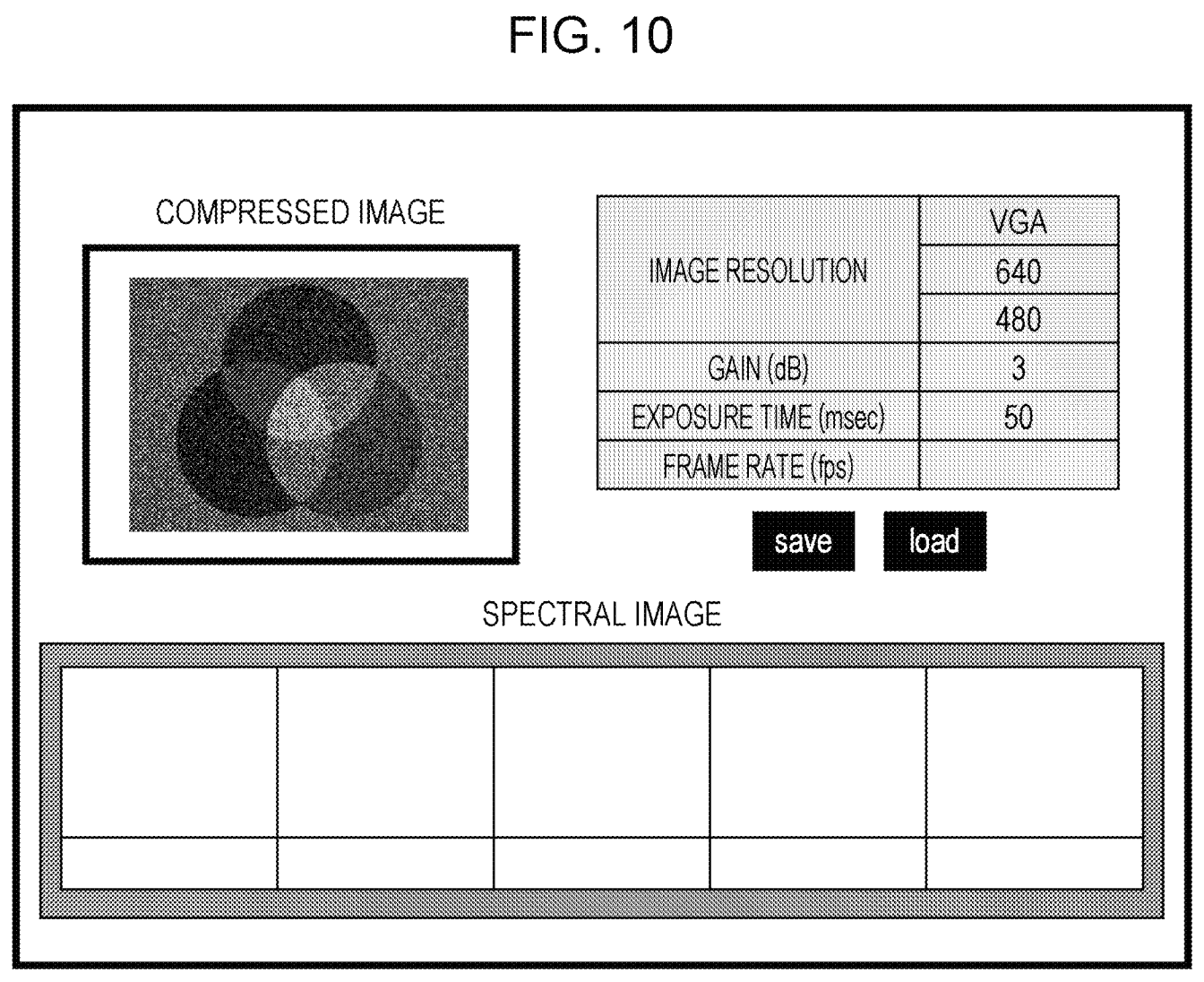

FIG. 10 illustrates an example of a GUI screen on which the imaging conditions are to be input. In the illustrated example, prior to taking a hyperspectral image, the user sets the image resolution, the gain, the exposure time, and the frame rate. The image resolution indicates the numbers of pixels in vertical and horizontal directions of a displayed image. The image resolution may be designated, for example, by the user selecting one of names, such as VGA, HD, and 4K, from a pulldown menu or directly inputting the numbers of pixels in the vertical and horizontal directions. The gain is designated as a rational number of greater than or equal to 0 and may be input as a value resulting from addition, subtraction, multiplication, or division of rational numbers. For instance, when 8/3 is input, the gain is set as 2.6666 . . . dB. As to the exposure time and the frame rate, it is not necessary to input both of them. The user may input at least one of the exposure time or the frame rate, and when competition occurs (e.g., when the exposure time of 100 msec and the frame rate of 30 fps are input as conditions), priority may be given to one of them. The function of automatically adjusting the gain, the exposure time, and the frame rate may be prepared in addition to input setting for the above-described four conditions. For instance, average light intensity may be automatically adjusted to ½ of maximum light intensity. As seen from the example illustrated in FIG. 10, the GUI for inputting the imaging conditions may have the functions of saving and loading the set imaging conditions. The GUI may further have the function of displaying in real time the compressed image that is obtained under the set imaging conditions. Here, it is not always required to display the compressed image itself. Any desired image obtained under the set imaging conditions at that time may be displayed. In an example, pixels outputting only values of red (R), green (G), and blue (B) may be arranged, and an obtained RGB image may be displayed using only the values of those pixels. In another example, reconstruction in three bands including a first band of longer than or equal to 400 nm and shorter than or equal to 500 nm, a second band of longer than or equal to 500 nm and shorter than or equal to 600 nm, and a third band of longer than or equal to 600 nm and shorter than or equal to 700 nm may be executed with a unit-band combination process described later, and a reconstruction result may be displayed as an RGB image.

Figure 11:
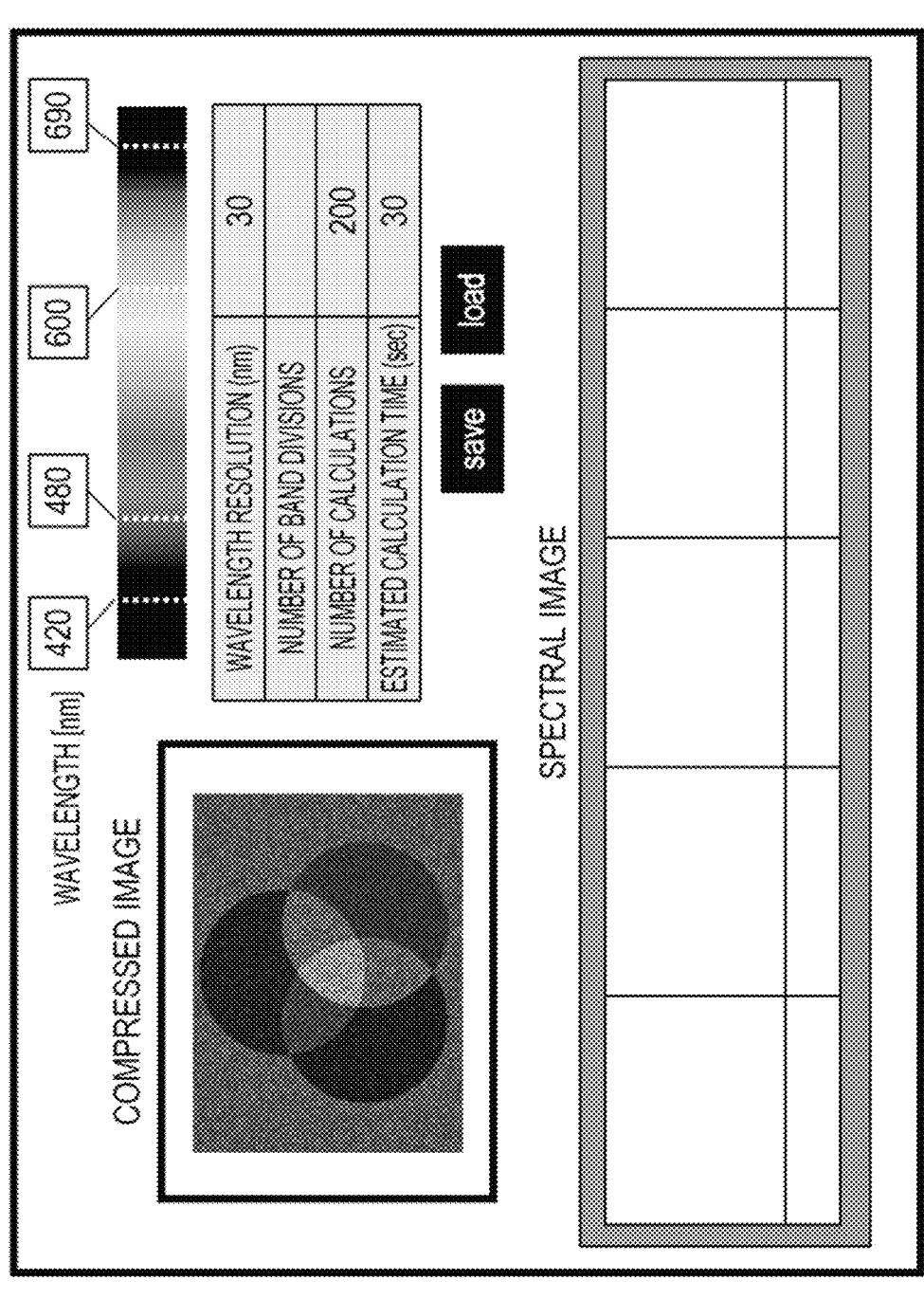
FIG. 11 illustrates an example of a GUI on which reconstruction conditions are to be input.

FIGS. 11 and 12 each illustrate an example of a GUI on which the reconstruction conditions are to be input. In the example illustrated in FIG. 11, the user inputs the sub-wavelength range, the wavelength resolution or the number of band divisions, and the number of calculations. Here, the number of calculations indicates the number of iterations of the reconstruction process expressed by the equation (2). As illustrated in FIG. 11, the sub-wavelength range may be designated by setting the lower limit wavelength and the upper limit wavelength with drag and drop. In the example illustrated in FIG. 11, the sub-wavelength range of longer than or equal to 420 nm and shorter than or equal to 480 nm and the sub-wavelength range of longer than or equal to 600 nm and shorter than or equal to 690 nm are designated. Instead of using drag and drop for the designation, as illustrated in FIG. 12, a span of one or more sub-wavelength ranges and a span of each wavelength band in each sub-wavelength range may be set by inputting numerical values. An area where the span of the one or more sub-wavelength ranges and the span of each wavelength band in each sub-wavelength range are input may be displayed as an independent window or may be arranged in a screen on which other setting items are input.

In the example illustrated in FIG. 11, the user inputs either one of the wavelength resolution and the number of band divisions. The number of calculations is designated as an arbitrary integer of greater than or equal to 1. Typically, a value greater than or equal to about 10 and smaller than or equal to 10000 may be designated as the number of calculations. In the example illustrated in FIG. 11, an estimated calculation time is also displayed. The estimated calculation time is not input by the user, but is automatically calculated from the resolution, the number of band divisions, and the number of calculations, which have been set, and is then displayed. The functions of inputting the number of calculations and displaying the estimated calculation time may be omitted. As an alternative, several modes, such as a high-precision mode (low speed), a balance mode (medium speed), and a high-speed mode (high speed), may be prepared, and one of those modes may be selected from a pull-down menu, for example. As illustrated in FIG. 11, the GUI may have the functions of saving and loading the set reconstruction conditions.

Figure 13:
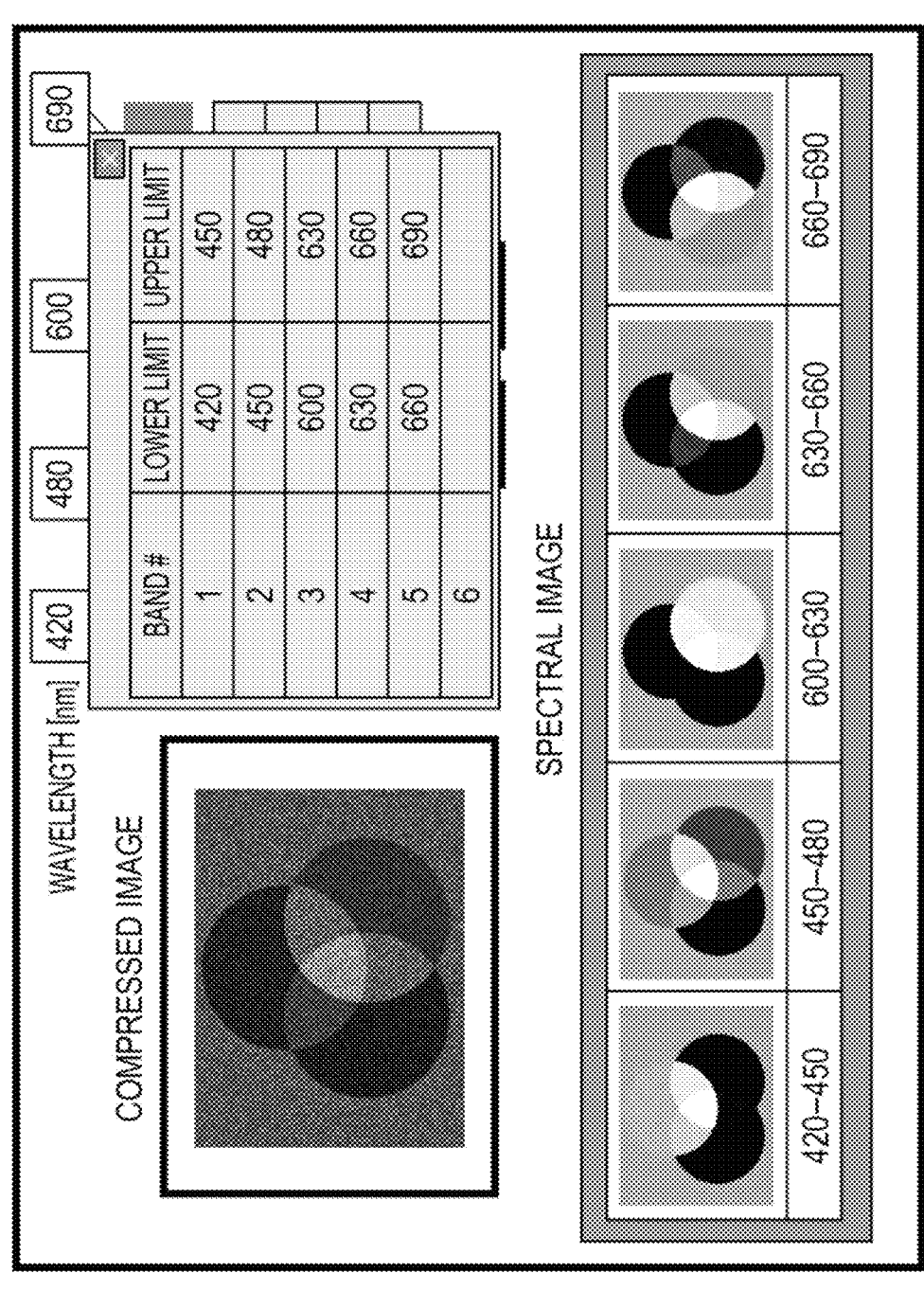
FIG. 13 illustrates an example of a screen displaying spectral images that are generated as a result of executing reconstruction calculation.

FIG. 13 illustrates an example of a screen displaying spectral images that are generated as a result of executing reconstruction calculation. The generated spectral images are linked with the set reconstruction conditions and are displayed in the form allowing each of the spectral images to be discriminated per set band. As illustrated in FIG. 13, by way of example, in addition to the reconstructed image in each band, the lower limit wavelength and the upper limit wavelength of the band may be displayed as numerical values. Alternatively, each band may be indicated as a number counted from a short wavelength side or a long wavelength side. The image in each band may be displayed in color belonging to the band. Physical values expressed in terms of wavelength (nm) in the above-described examples may be all expressed in terms of wave number (e.g., $cm^{-1}$) or frequency (e.g., Hz).

Figure 14:
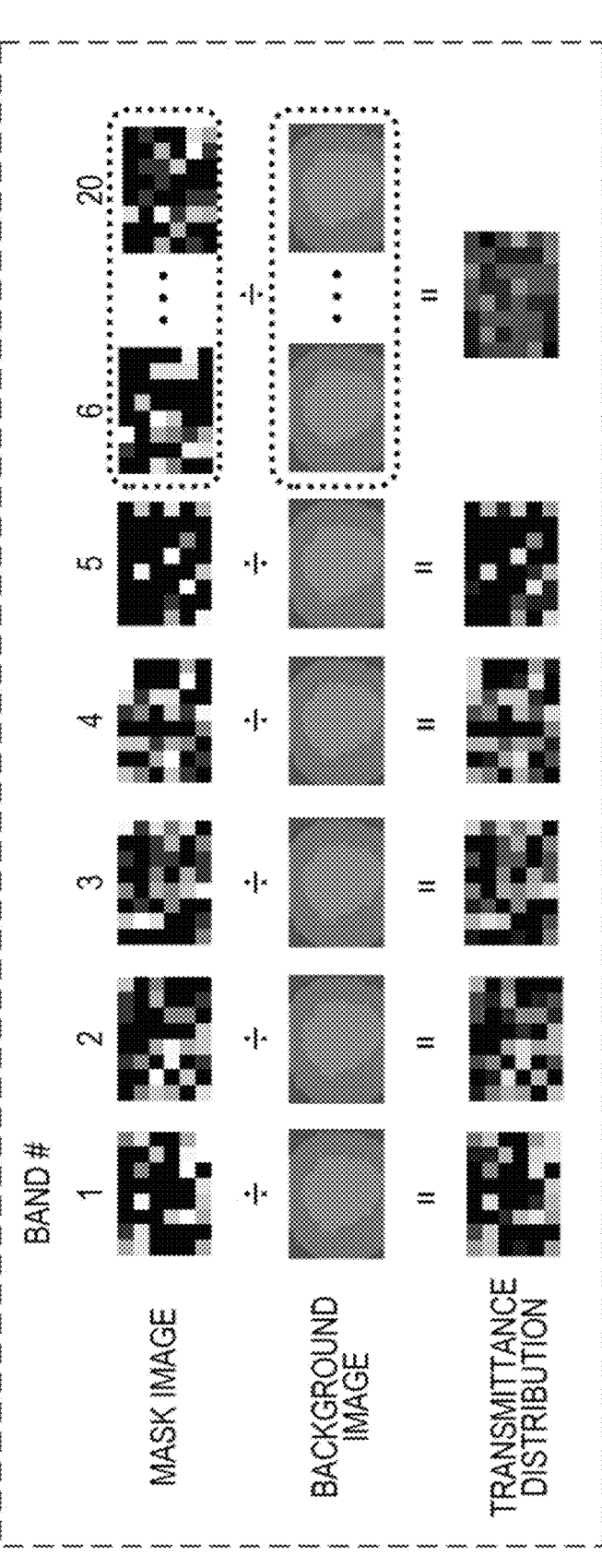
FIG. 14 is an explanatory view illustrating an example of a method of combining pieces of mask information for bands and converting those pieces to new mask information.

FIG. 14 is an explanatory view illustrating an example of a method of combining pieces of mask information for bands and converting those pieces to new mask information. In the illustrated example, mask information for unit bands #1 to 20 is previously stored as mask information before the conversion in the memory 210 as illustrated in FIG. 9. In the example illustrated in FIG. 14, the combination process is not executed for the unit bands #1 to 5 and is executed for the unit bands #6 to 20. For the unit bands #1 to 5, the transmittance distribution of the filter array 110 is calculated by dividing a value in each area of the mask image by a value in a corresponding area of the background image. Here, data of each mask image stored in the memory 210 is referred to as "unit mask image data", and data of each background image stored therein is referred to as "unit background image data". For the bands #6 to 20, a combined transmittance distribution is obtained by dividing data resulting from adding the unit mask image data for the bands #6 to 20 per pixel by data resulting from adding the unit background image data for the bands #6 to 20 per pixel. By executing the above-described operation, pieces of the mask information can be combined for any desired bands. When the background image has very high uniformity, the mask information substantially matches the mask image. In such a case, the data resulting from adding the mask image data for the bands #6 to 20, or data resulting from averaging the added data may be used as combined mask data for the bands #6 to 20.

In the example illustrated in FIG. 9, the mask information is recorded for each of many unit bands with the width of 1 nm. On other hand, in the example illustrated in FIG. 12, each of the wavelength bands designated by the user has a relatively wide width of 30 nm. In the latter case, the signal processing circuit 250 executes the reconstruction by combining pieces of the mask information for the unit bands for each of the designated wavelength bands.

A process of converting the mask data through combination may be executed in an environment where the end user uses the signal processing device, or may be executed in a production site, for example, a system production factory. When the process of converting the mask data is executed in the production site, the mask data after the conversion is previously stored in the memory 210 instead of or in addition to the mask data before the conversion.

As described above, the mask data is used to generate the spectral image data for each wavelength band from the compressed image data obtained by the imaging device that includes the filter array including the plural types of optical filters with the spectral transmittances different from one another. A method of converting the mask data in this embodiment includes steps described below.

Obtain first mask data to generate first spectral image data corresponding to a first wavelength band group in the target wavelength range.

Obtain setting data to designate one or more sub-wavelength ranges that are parts of the target wavelength range.

Generate, based on the first mask data and the setting data, second mask data to generate second spectral image data corresponding to a second wavelength band group in the sub-wavelength range.

The first mask data may be, for example, data to reconstruct, from the compressed image, the spectral image for each of all unit bands included in the target wavelength range. The second mask data may be, for example, data to reconstruct, from the compressed image, the spectral image for each of all unit bands included in each designated sub-wavelength range. The second mask data may be data to reconstruct, from the compressed image, the spectral image for each combined band resulting from combining the unit bands. When the above-described combination is executed, the setting data may include data with respect to a scheme of the band combination. In the following description, the combined band resulting from combining the unit bands is also referred to as a "post-edit band").

The first mask data and the second mask data are each data reflecting the spatial distribution of the spectral transmittance of the filter array. The first mask data includes first mask information reflecting the spatial distribution of the spectral transmittance corresponding to the first wavelength band group. The second mask data includes second mask information reflecting the spatial distribution of the spectral transmittance corresponding to the second wavelength band group.

The second mask data may further include third mask information resulting from combining pieces of information representing the spatial distribution of the spectral transmittance corresponding to a third wavelength band group included in a not-designated wavelength range other than one or more designated sub-wavelength ranges. In such a case, the signal processing circuit 250 can generate, based on the compressed image and the second mask data, the spectral image with relatively high wavelength resolution for each designated sub-wavelength range and the spectral image with relatively low wavelength resolution for the not-designated wavelength range.

FIGS. 15A and 15B each illustrate an example of the second mask data after the conversion, which is to be recorded on the memory 210. In the example illustrated in FIG. 15A, the mask image and the background image are stored as the mask information after the conversion in a combined state for each of the post-edit bands with a width of 10 nm. When the background image has very high uniformity, the mask data does not need to include information of the background image. In the example illustrated in FIG. 15B, the mask data after the conversion is stored in a state of combined mask data, which is resulted from dividing the mask image by the background image, for each of the post-edit bands with a width of 10 nm. The wavelength width of the post-edit band is not limited to 10 nm and may be set as desired.

The combined mask image is given as an image in which, as the band width after the combination increases, a larger number of unit mask images are averaged. Similarly, the combined mask data is given as data in which, as the band width after the combination increases, the mask data resulting from dividing a larger number of unit mask images by unit background images are averaged. Therefore, the combined mask image or the combined mask data tends to become data with smaller contrast as the band width after the combination increases.

Figure 16:
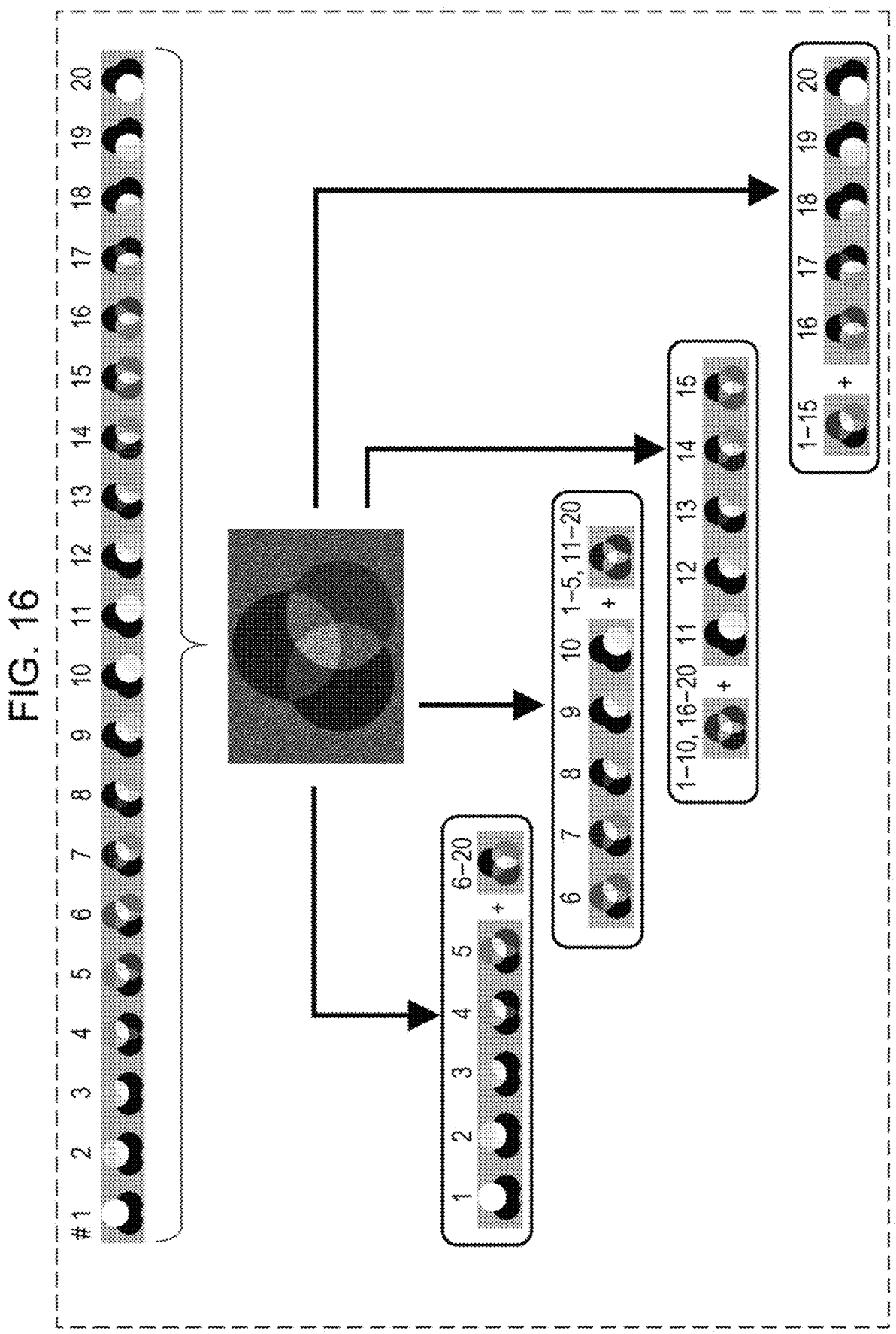
FIG. 16 illustrates an example of a method of generating an image for each of the wavelength bands included in the target wavelength range.

FIG. 16 illustrates an example of a method of generating an image for each of the wavelength bands included in the target wavelength range. In the illustrated example, the target wavelength range includes four sub-wavelength ranges. A first sub-wavelength range includes bands #1 to 5. A second sub-wavelength range includes bands #6 to 10. A third sub-wavelength range includes bands #11 to 15. A fourth sub-wavelength range includes bands #16 to 20. In this example, the signal processing circuit 250 executes, with respect to each sub-wavelength range, the reconstruction calculation by combining pieces of the mask information for all the unit bands not belonging to the relevant sub-wavelength range. As illustrated in FIG. 16, for arbitrary one of the sub-wavelength ranges, a good spectral image can be generated for each band in the relevant sub-wavelength range even when pieces of the mask information for the unit bands not included in the relevant sub-wavelength range are combined. With the above-described combination process, the calculation time necessary for generating the images for the individual bands can be shortened.

Modifications of the Embodiment Will be Described Below

Figure 17:
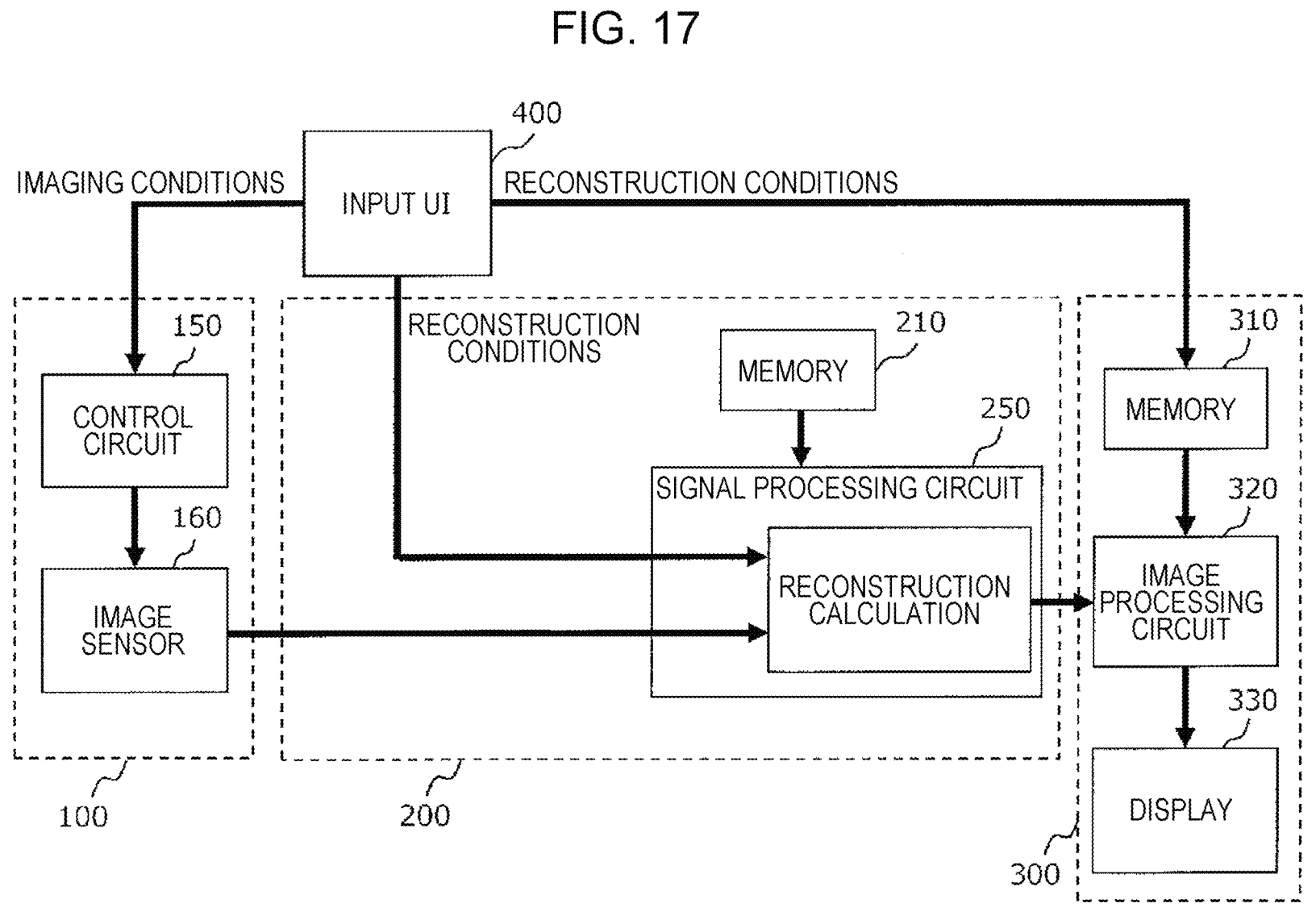

FIG. 17 illustrates a configuration of a system in which the signal processing circuit 250 does not execute the conversion of the mask information. In this example, the signal processing circuit 250 reads the reconstruction conditions given from the input UI 400 and the mask information stored in the memory 210 and generates the spectral image from the compressed image obtained from the image sensor 160. In this case, the signal processing circuit 250 generates the spectral images over the entirety of the target wavelength range and outputs the generated spectral images to the image processing circuit 320. The image processing circuit 320 displays only ones of the obtained spectral images for parts of the wavelength bands on the display 330 in accordance with the set reconstruction conditions.

Figure 18:
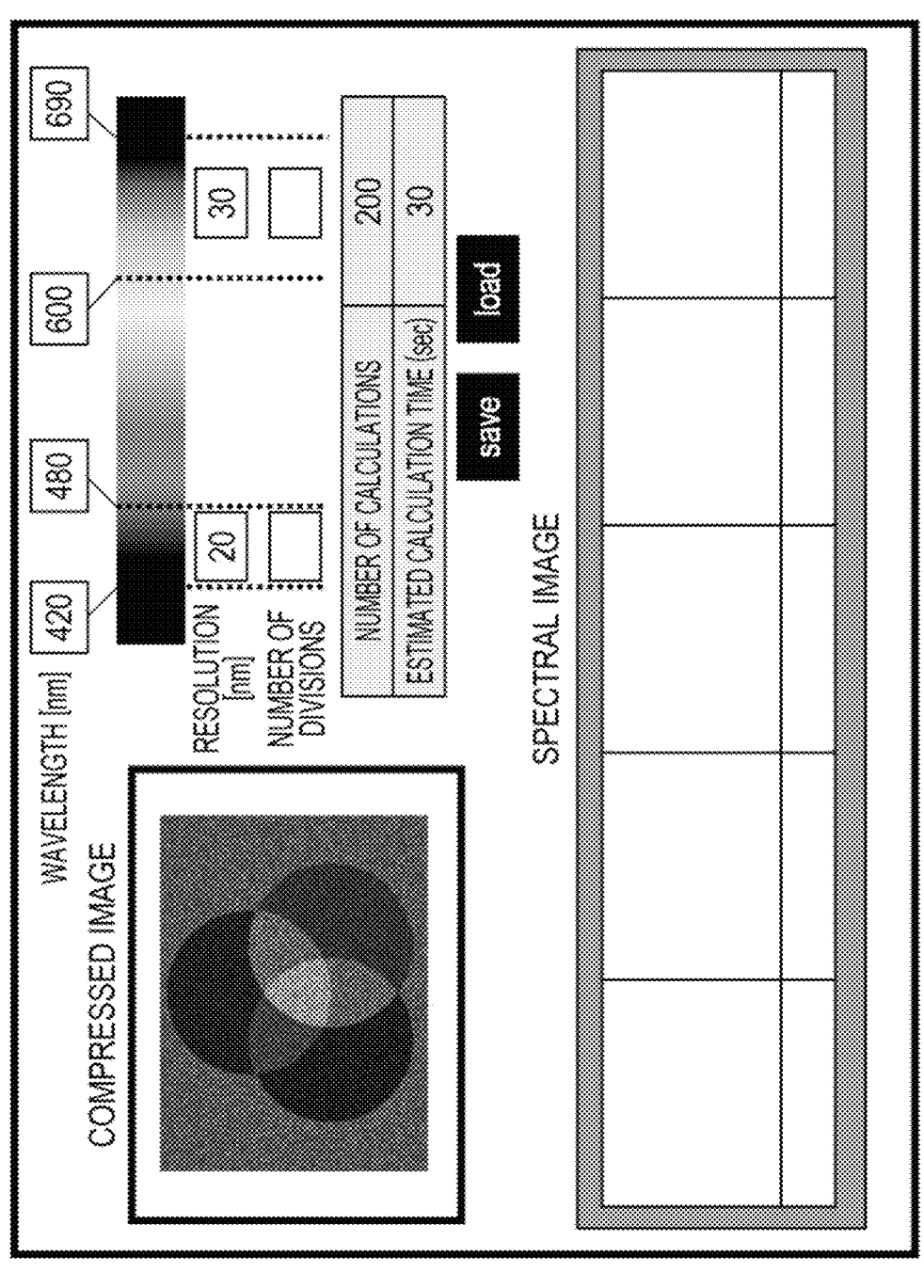
FIG. 18 illustrates another example of the GUI on which the reconstruction conditions are to be set.

FIG. 18 illustrates another example of the GUI on which the reconstruction conditions are to be set. In the illustrated example, the wavelength resolution or the number of band divisions can be designated to be different for each of the set sub-wavelength ranges. The user inputs either one of the wavelength resolution and the number of band divisions for each of the sub-wavelength ranges. The signal processing circuit 250 executes the reconstruction calculation in accordance with the wavelength resolution or the number of band divisions which has been input. With the above-described configuration, the spectral image can be generated with different resolution for each of the sub-wavelength ranges.

Figure 19:
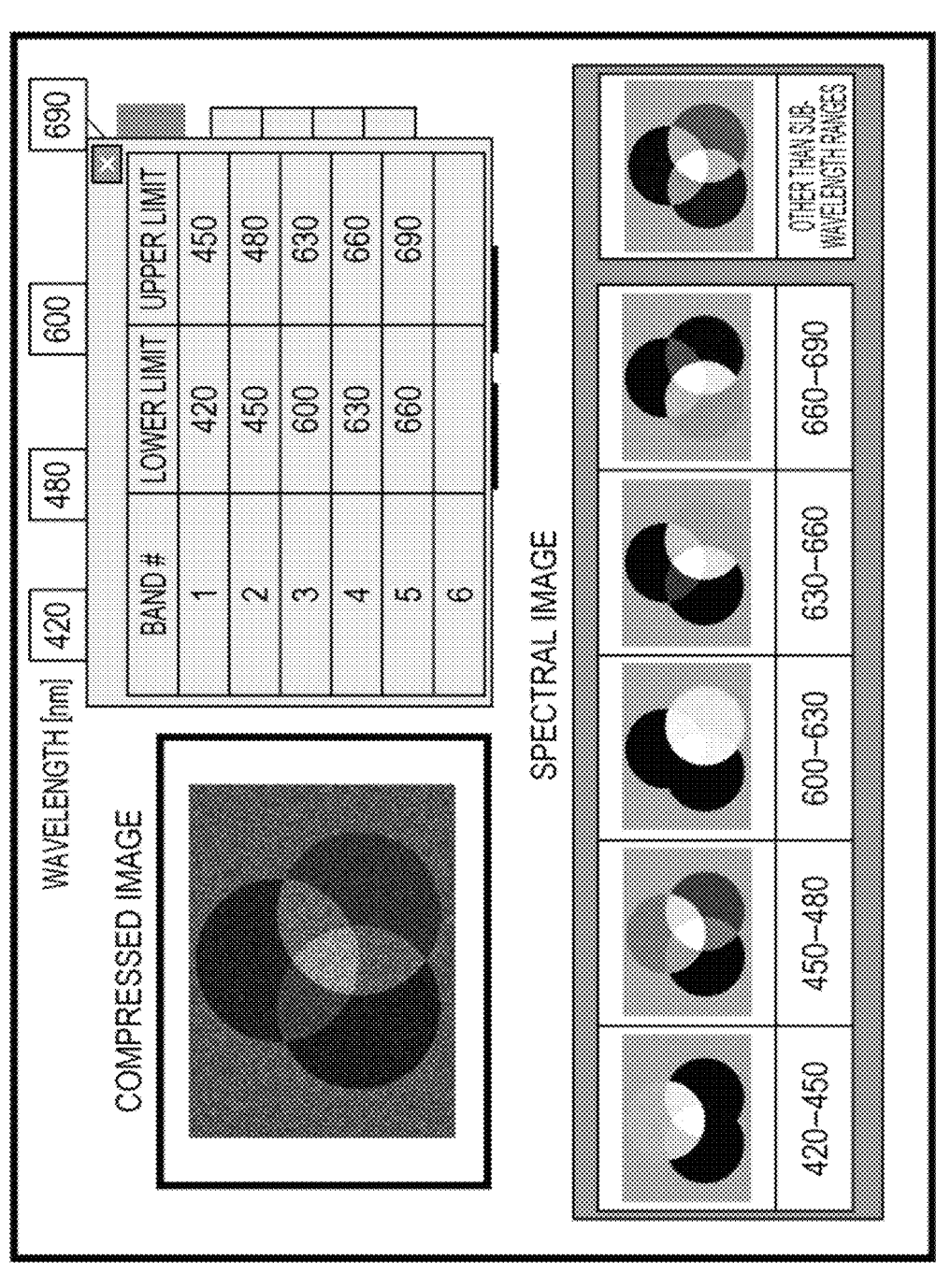
FIG. 19 illustrates an example in which an image in a not-designated wavelength range is displayed.

FIG. 19 illustrates an example of a UI for displaying an image generated from the mask information combined for a wavelength range (hereinafter referred to as a "not-designated wavelength range") that is included in the target wavelength range, but that is not included in any of the sub-wavelength ranges. While one image generated for the not-designated wavelength range is displayed in the example illustrated in FIG. 19, images for two or more not-designated wavelength ranges may be displayed. An RGB image may be displayed instead of or in addition to the image for the not-designated wavelength range. In such a case, the target wavelength range includes a visible wavelength range, and the signal processing circuit 250 combines pieces of the mask information for each of the wavelength ranges of red (R), green (G), and blue (B). By using the combined mask information, the signal processing circuit 250 generates image data for each of the red, green, and blue wavelength ranges from the compressed image data. The image processing circuit 320 displays the generated RGB image on the display 330.

Figure 20:
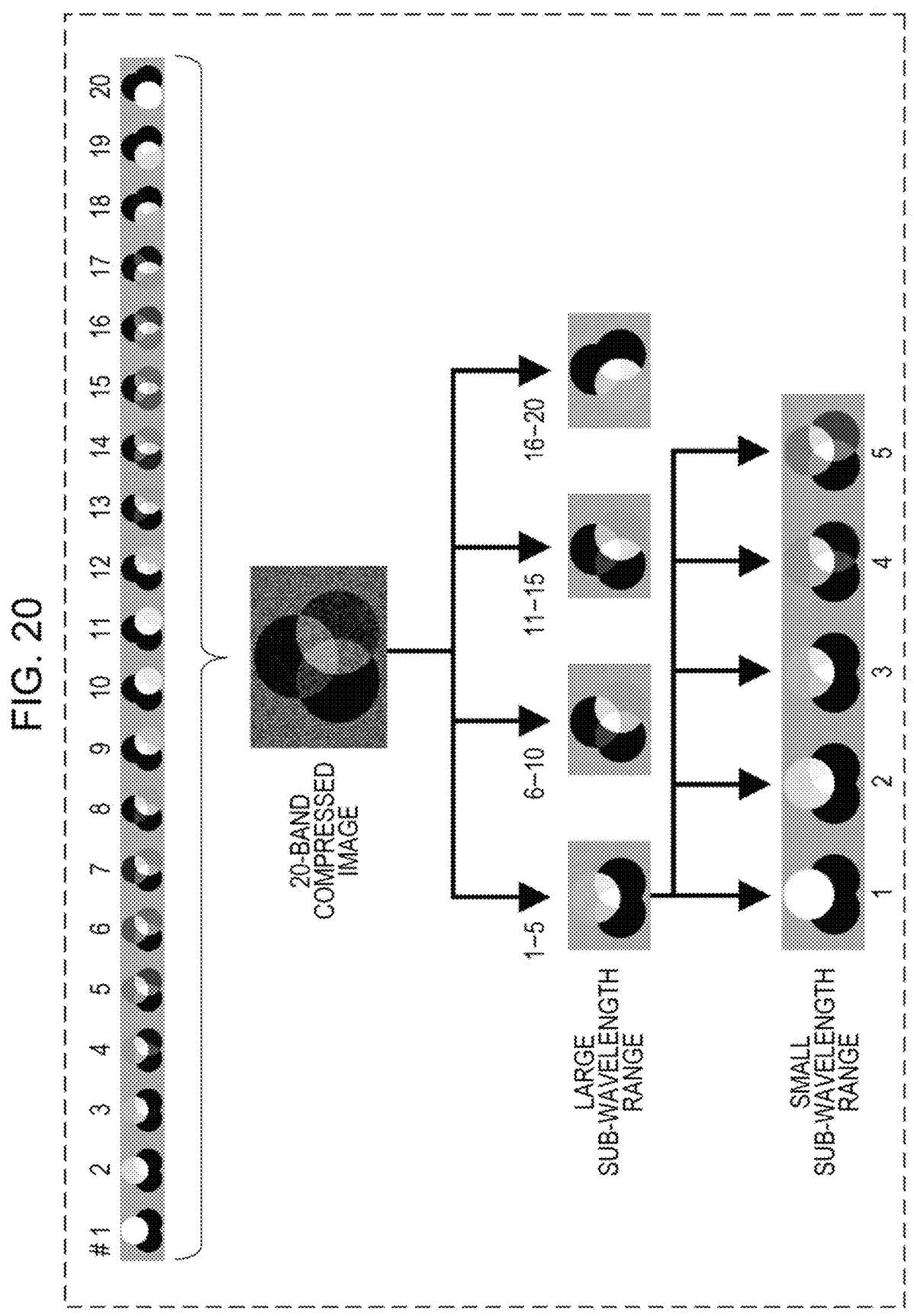
FIG. 20 illustrates an example of a method of reconstructing only a specific sub-wavelength range with higher wavelength resolution by executing reconstruction in two stages.

FIG. 20 illustrates an example of a method of reconstructing only a specific sub-wavelength range with higher wavelength resolution by executing the reconstruction in two stages. In this example, a compressed image for the target wavelength range including 20 unit bands is obtained. By using the method described above with reference to FIG. 16, the signal processing circuit 250 executes the reconstruction for four relatively large sub-wavelength ranges (hereinafter referred to as "large sub-wavelength ranges") each spanning, for example, from first to fifth band, from sixth to tenth band, from eleventh to fifteenth band, or from sixteenth to twentieth band. Then, the signal processing circuit 250 executes the reconstruction such that designated specific one of the large sub-wavelength ranges is divided into smaller bands (hereinafter referred to as "small sub-wavelength ranges"). The number of the large sub-wavelength ranges to be divided into the small sub-wavelength ranges can be determined as desired. While, in the example illustrated in FIG. 20, only one large sub-wavelength range is divided into the small sub-wavelength ranges, two or more large sub-wavelength ranges may be each divided into the small sub-wavelength ranges. While, in the example illustrated in FIG. 20, the signal processing circuit 250 executes the band division in two stages, the spectral images may be generated through divisions in three or more stages. The small sub-wavelength ranges may be the unit bands.

Furthermore, whenever the band division in each stage is executed, which one of the divided wavelength ranges is to be further divided into smaller sub-wavelength ranges may be selected. This selection may be made by the user or automatically.

In the example illustrated in FIG. 20, the set data includes information designating the large sub-wavelength ranges each being part of the target wavelength range and the small sub-wavelength ranges included in at least one of the large sub-wavelength ranges. The signal processing circuit 250 executes the following processes.

Generate, for each of the large sub-wavelength ranges, first combined mask information resulting from combining pieces of the mask information for the unit bands included in the large sub-wavelength range.

Generate, for each of the large sub-wavelength ranges, first combined image data based on both the compressed image data and the first combined mask information.

Generate, for each of the small sub-wavelength ranges in the designated large sub-wavelength range, second combined mask information resulting from combining pieces of the mask information for the unit bands included in the small sub-wavelength range.

Generate, for each of the small sub-wavelength ranges, second combined image data based on both the first combined image data for the designated large sub-wavelength ranges and the second combined mask information.

In the above case, the generated hyperspectral data cube includes the second combined image data for the small sub-wavelength ranges. With the above-mentioned process, it is possible to obtain the spectral information that is detailed only for the specific large sub-wavelength range designated by the user.

The configuration of the imaging device, the compression algorithm for the hyperspectral information, and the reconstruction algorithm for the hyperspectral data cube are not limited to those described in the above embodiment. For instance, the layouts of the filter array 110, the optical system 140, and the image sensor 160 are not limited to those illustrated in FIGS. 1A to 1D and may be modified as appropriate. The characteristics of the filter array 110 are not limited to those described with reference to FIGS. 2A to 4B, the filter array 110 with optimum characteristics is used depending on the application and the purpose. The spectral image for each wavelength band may be generated by a method other than the calculation using the above-described compressed sensing represented by the above-described equation (2). Another statistical method, such as maximum likelihood estimation or Bayesian inference, for example, may also be used.

While in the above-described embodiment, the compressed image data is generated by the imaging device 100 including the filter array 110, the compressed image data may be generated by a different method. For instance, the compressed image data may be generated by causing a coding matrix corresponding to the matrix H in the above-described equation (1) to act on a hyperspectral data cube that is generated by any suitable hyperspectral camera. When the volume of data needs to be reduced for storage or transmission of the data, the compressed image data may be generated through a software process dedicated for that purpose. Even for the compressed image data generated through such a software process, an image for each wavelength band can be reconstructed by applying the above-described process in the embodiment.

The technique according to the present disclosure is useful for use in, for example, a camera or a measuring device to obtain a multiwavelength image. The technique according to the present disclosure can be further applied to, for example, sensing for biological, medical, and beauty purposes, inspection systems for foreign matters and residual agricultural pesticides in foods, remote sensing, and an onboard sensing system.

What is claimed is:

1. A signal processing method executed by a computer, comprising:

obtaining compressed image data including two-dimensional image information that is obtained by compressing hyperspectral information corresponding to wavelength bands included in a target wavelength range;

obtaining setting data including information designating one or more sub-wavelength ranges that are parts of the target wavelength range; and generating, based on the compressed image data and the setting data, two-dimensional images corresponding to wavelength bands included in the one or more sub-wavelength ranges, wherein the setting data is obtained before the two-dimensional images are generated, the method further comprising generating, based on the compressed image data, one or more combined images corresponding to a not-designated wavelength range in the target wavelength range other than the one or more sub-wavelength ranges, and a wavelength resolution of the two-dimensional images is higher than a wavelength resolution of the one or more combined images.

2. The method according to claim 1, wherein:

the wavelength bands included in the target wavelength range are four or more wavelength bands included in the target wavelength range, the two-dimensional image information is data items of pixels included in the compressed image data, and information items corresponding to four or more wavelength bands are superimposed in each of the data items of the pixels.

3. The method according to claim 1, wherein:

the setting data includes information designating one or more wavelength resolutions corresponding to the one or more sub-wavelength ranges, and the two-dimensional images are generated with the one or more wavelength resolutions.

4. The method according to claim 1, wherein:

the one or more sub-wavelength ranges include a first sub-wavelength range and a second sub-wavelength range, and the two-dimensional images include two-dimensional images corresponding to the first sub-wavelength range and two-dimensional images corresponding to the second sub-wavelength range.

5. The method according to claim 3, wherein:

the one or more sub-wavelength ranges include a first sub-wavelength range and a second sub-wavelength range, the one or more wavelength resolutions includes a wavelength resolution corresponding to the first sub-wavelength range and a wavelength resolution corresponding to the second sub-wavelength range, the wavelength resolution corresponding to the first sub-wavelength range and the wavelength resolution corresponding to the second sub-wavelength range being determined independently, and the two-dimensional images include two-dimensional images corresponding to the first sub-wavelength range and generated with the wavelength resolution corresponding to the first sub-wavelength range, and two-dimensional images corresponding to the second sub-wavelength range and generated with the wavelength resolution corresponding to the second sub-wavelength range.

6. The method according to claim 4, wherein:

the first sub-wavelength range and the second sub-wavelength range are away from each other.

7. The method according to claim 1, further comprising:

displaying, on a display connected to the computer, a graphical user interface on which a user inputs the setting data.

8. The method according to claim 1, further comprising:

displaying the two-dimensional images on a display connected to the computer.

9. The method according to claim 1, wherein:

the compressed image data is generated by taking an image with an image sensor and a filter array including optical filters different in spectral transmittance, the method further comprises obtaining mask data reflecting a spatial distribution of the spectral transmittance of the filter array, and the two-dimensional images are generated based on the compressed image data and the mask data.

10. A signal processing method executed by a computer, comprising:

obtaining compressed image data including two-dimensional image information that is obtained by compressing hyperspectral information corresponding to wavelength bands included in a target wavelength range;

obtaining setting data including information designating one or more sub-wavelength ranges that are parts of the target wavelength range; and generating, based on the compressed image data and the setting data, two-dimensional images corresponding to wavelength bands included in the one or more sub-wavelength ranges, wherein the setting data is obtained before the two-dimensional images are generated, the compressed image data is generated by taking an image with an image sensor and a filter array including optical filters different in spectral transmittance, the method further comprises obtaining mask data reflecting a spatial distribution of the spectral transmittance of the filter array, the two-dimensional images are generated based on the compressed image data and the mask data, the mask data includes mask information, the mask information represents a spatial distribution of transmittance of the filter array corresponding to each of unit bands included in the target wavelength range, and the method further comprises:

generating combined mask information by combining parts of the mask information, the parts corresponding to unit bands included in a not-designated wavelength range in the target wavelength range other than the one or more sub- wavelength ranges; and generating a combined image corresponding to the not-designated wavelength range based on both the compressed image data and the combined mask information.

11. The method according to claim 10, wherein:

the mask data includes background images and mask images, the background images are obtained by capturing backgrounds with the image sensor without interposition of the filter array, the background images corresponding one-to-one to the backgrounds, the mask images are obtained by capturing backgrounds with the image sensor through the filter array, the mask images corresponding one-to-one to the backgrounds, and the combined mask information is generated based on the mask images and the background images.

12. The method according to claim 10, further comprising:

displaying the combined image on a display connected to the computer.

13. The method according to claim 9, wherein:

the mask data includes mask information, the mask information represents a spatial distribution of transmittance of the filter array corresponding to each of unit bands included in the target wavelength range, the setting data includes information designating large sub-wavelength ranges each being part of the target wavelength range and small sub-wavelength ranges included in one of the large sub-wavelength ranges, the method further comprises:

generating, for each of the large sub-wavelength ranges, first combined mask information by combining parts of the mask information, the parts corresponding to unit bands included in each of the large sub-wavelength ranges; and generating a first combined image for each of the large sub-wavelength ranges based on both the compressed image data and the first combined mask information, and the two-dimensional images correspond to the small sub-wavelength ranges and are based on the first combined images.

14. The method according to claim 10, wherein:

the target wavelength range includes a visible wavelength range, and the method further comprises:

generating, based on the compressed image data and the combined mask information, an image corresponding to a red wavelength range, an image corresponding to a green wavelength range, and an image corresponding to a blue wavelength range; and displaying, on a display connected to the computer, an RGB image based on the image corresponding to the red wavelength range, the image corresponding to the green wavelength range, and the image corresponding to the blue wavelength range.

15. A signal processing device comprising:

a processor; and a memory storing a computer program executed by the processor, the computer program causing the processor to execute:

obtaining compressed image data including two-dimensional image information that is obtained by compressing hyperspectral information in a target wavelength range;

obtaining setting data to designate one or more sub-wavelength ranges that are parts of the target wavelength range; and generating, based on the compressed image data and the setting data, two- dimensional images corresponding to wavelength bands included in the one or more sub- wavelength ranges, wherein the setting data is obtained before the two-dimensional images are generated, the computer program causing the processor to further execute generating, based on the compressed image data, one or more combined images corresponding to a not-designated wavelength range in the target wavelength range other than the one or more sub-wavelength ranges, and a wavelength resolution of the two-dimensional images is higher than a wavelength resolution of the one or more combined images.

16. An imaging system comprising:

the signal processing device according to claim 15, and an imaging device generating the compressed image data.

17. A non-transitory computer-readable recording medium storing a program causing a computer to execute:

obtaining compressed image data including two-dimensional image information that is obtained by compressing hyperspectral information corresponding to wavelength bands included in a target wavelength range;

obtaining setting data to designate one or more sub-wavelength ranges that are parts of the target wavelength range; and generating, based on the compressed image data and the setting data, two-dimensional images corresponding to wavelength bands included in the one or more sub-wavelength ranges, wherein the setting data is obtained before the two-dimensional images are generated, the program causing the computer to further execute generating, based on the compressed image data, one or more combined images corresponding to a not-designated wavelength range in the target wavelength range other than the one or more sub-wavelength ranges, and a wavelength resolution of the two-dimensional images is higher than a wavelength resolution of the one or more combined images.

\* \* \* \* \*